(12) United States Patent
Tezuka et al.

(10) Patent No.: US 11,343,397 B2
(45) Date of Patent: May 24, 2022

(54) IMAGE READING APPARATUS

(71) Applicant: SEIKO EPSON CORPORATION, Tokyo (JP)

(72) Inventors: Seiji Tezuka, Kitakyushu (JP); Keiichiro Fukumasu, Kitakyushu (JP); Hidenori Harada, Kitakyushu (JP); Tomoyuki Mokuo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/164,426

(22) Filed: Feb. 1, 2021

(65) Prior Publication Data
US 2021/0243316 A1   Aug. 5, 2021

(30) Foreign Application Priority Data

Feb. 3, 2020   (JP) ............................. JP2020-016290

(51) Int. Cl.
*H04N 1/00*   (2006.01)

(52) U.S. Cl.
CPC ..... *H04N 1/00562* (2013.01); *H04N 1/00535* (2013.01); *H04N 1/00551* (2013.01);
(Continued)

(58) Field of Classification Search
CPC ............ B65H 2220/01; B65H 2511/10; B65H 2511/216; B65H 2511/242; B65H 2511/414; B65H 2220/02; B65H 2220/03; B65H 2402/46; B65H 2801/39; B65H 3/063; B65H 3/0653; B65H 7/02; B65H 7/20; G03G 21/1846; G03G 2221/1815; G03G 15/751; G03G 21/1842; G03G 21/185; G03G 15/2039; G03G 15/2042; G03G 15/2053; G03G 15/2064; G03G 15/602; G03G 15/6529; G03G 21/1619; G03G 21/1647; G03G 2215/00189; G03G 2215/2006; H04N 1/00002;
(Continued)

(56) References Cited

U.S. PATENT DOCUMENTS 6,243,439 B1 * 6/2001 Arai .................. A61B 6/14
378/20
7,283,770 B2 * 10/2007 Kim .................. H04N 1/00
399/167
(Continued)

FOREIGN PATENT DOCUMENTS

JP   2009-527143   7/2009

*Primary Examiner* — Negussie Worku
(74) *Attorney, Agent, or Firm* — Workman Nydegger

(57) ABSTRACT

An image reading apparatus includes a support section in contact with a mounting surface on which the apparatus is mounted, an apparatus body including a reader, the apparatus body, and a position holding section. The position of the apparatus body can be switched between a first position in which the apparatus body is not in use and a second position in which the apparatus body reads a document using the reader, and in which a projected area of the apparatus body on the mounting surface is larger than that in the first position, and the center of gravity of the apparatus body is lower than or equal to a rotation axis center of the apparatus body in a vertical direction viewed in a rotation axis direction of the apparatus body when the apparatus body is in the first position or in the second position.

20 Claims, 13 Drawing Sheets

(52) U.S. Cl.
CPC ..... *H04N 1/00559* (2013.01); *H04N 1/00602* (2013.01); *H04N 1/00615* (2013.01); *H04N 1/00628* (2013.01); *H04N 1/00795* (2013.01)

(58) Field of Classification Search
CPC .......... H04N 1/00525; H04N 1/00559; H04N 1/00694; H04N 1/00718; H04N 1/00795; H04N 1/0032; H04N 1/00535; H04N 1/00551; H04N 1/00554; H04N 1/00562; H04N 1/00602; H04N 1/00615; H04N 1/00628
USPC ........................................................ 358/498
See application file for complete search history.

(56) References Cited

U.S. PATENT DOCUMENTS

| | | | |
|---|---|---|---|
| 8,266,177 B1* | 9/2012 | Seymour | G06F 16/9038 |
| | | | 707/783 |
| 10,404,878 B2* | 9/2019 | Shiota | B65H 7/06 |
| 10,530,951 B2* | 1/2020 | Miyauchi | H04N 1/00535 |
| 2007/0188818 A1 | 8/2007 | Westcott et al. | |
| 2017/0134598 A1* | 5/2017 | Nagano | G03G 21/1619 |
| 2019/0132455 A1 | 5/2019 | Miyauchi et al. | |
| 2019/0132464 A1 | 5/2019 | Miyauchi et al. | |

* cited by examiner

IMAGE READING APPARATUS

The present application is based on, and claims priority from JP Application Serial Number 2020-016290, filed Feb. 3, 2020, the disclosure of which is hereby incorporated by reference herein in its entirety.

BACKGROUND

1. Technical Field

The present disclosure relates to an image reading apparatus for reading images on documents.

2. Related Art

Some image reading apparatuses such as scanners have a sheet transport path provided in the housing of the apparatus body, and the position of the sheet transport path can be changed between a first position in which the sheet transport path is tilted with respect to the horizontal direction and a second position in which the sheet transport path is closer to the horizontal position than the first position, for example, as described in JP-T-2009-527143. In the image reading apparatus in JP-T-2009-527143, the apparatus body is turnable with respect to a support base and the position of the apparatus body with respect to the support base can be maintained using a latch mechanism.

In a state in which the user can change the position of the apparatus body with respect to the support base, however, the user may fail to support the apparatus body with the hands. However, the image reading apparatus in JP-T-2009-527143 has no special means for stabilizing the apparatus body in such a case.

SUMMARY

According to an aspect of the present disclosure, an image reading apparatus includes a support section in contact with a mounting surface on which the apparatus is mounted, an apparatus body including a reader configured to read a document, the apparatus body being configured to be turned with respect to the support section for position change, and a position holding section for holding a position of the apparatus body with respect to the support section, in which the position of the apparatus body can be switched between a first position in which the apparatus body is not in use and a second position in which the apparatus body reads a document using the reader, and in which a projected area of the apparatus body on the mounting surface is larger than that in the first position, and the center of gravity of the apparatus body is lower than or equal to a rotation axis center of the apparatus body in a vertical direction viewed in a rotation axis direction of the apparatus body when the apparatus body is in the first position or in the second position.

DESCRIPTION OF EXEMPLARY EMBODIMENTS

Figure 1:
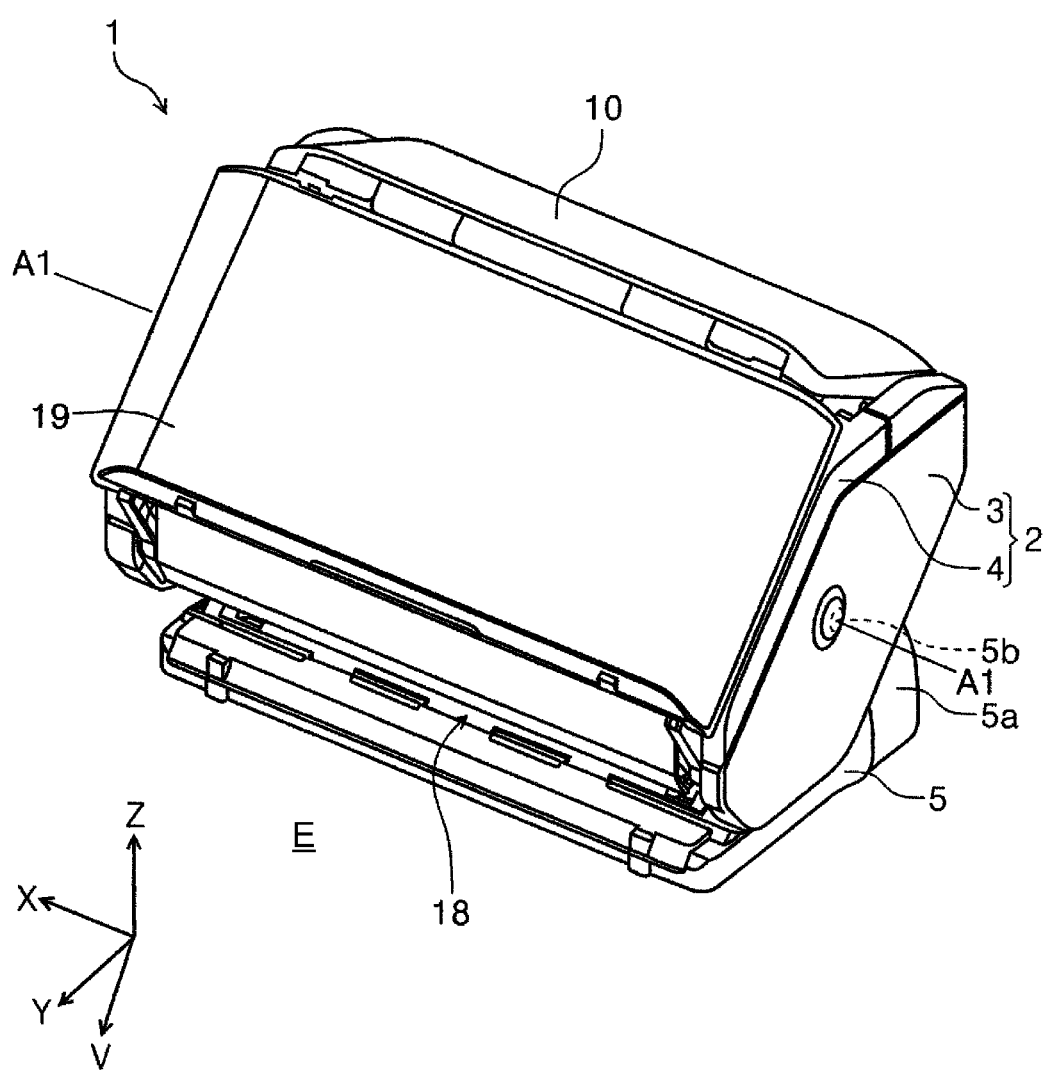
FIG. 1 is an external perspective view illustrating a scanner with a front cover and a top cover closed, viewed from the front in a state in which an apparatus body is in a second position.

Hereinafter, an overview of the present disclosure will be described. An image reading apparatus according to a first aspect includes a support section in contact with a mounting surface on which the apparatus is mounted, an apparatus body including a reader configured to read a document, the apparatus body being configured to be turned with respect to the support section for position change, and a position holding section for holding a position of the apparatus body with respect to the support section, in which the position of the apparatus body can be switched between a first position in which the apparatus body is not in use and a second position in which the apparatus body reads a document using the reader, and in which a projected area of the apparatus body on the mounting surface is larger than that in the first position, and the center of gravity of the apparatus body is lower than or equal to a rotation axis center of the apparatus body in a vertical direction viewed in a rotation axis direction of the apparatus body when the apparatus body is in the first position or in the second position.

According to the aspect, the center of gravity of the apparatus body is lower than or equal to a rotation axis center of the apparatus body in a vertical direction viewed in a rotation axis direction of the apparatus body when the apparatus body is in the first position or in the second position. Consequently, the apparatus body is stable with respect to the support section.

According to a second aspect, in the first aspect, when the apparatus body is in the first position, the center of gravity of the apparatus body may overlap with the rotation axis center of the apparatus body viewed in the rotation axis direction of the apparatus body. According to the aspect, when the apparatus body is in the first position, the center of gravity of the apparatus body corresponds to the rotation axis center of the apparatus body viewed in the rotation axis direction of the apparatus body, and thus no rotation moment is produced in the apparatus body when the apparatus body is in the first position, enabling more stable apparatus body with respect to the support section.

According to a third aspect, in the first aspect or the second aspect, the apparatus body may include a feed tray configured to support the document to be fed, and a discharge tray configured to support the document that is read and discharged, in which the feed tray and the discharge tray are configured to be switched between an open state and a closed state with respect to the apparatus body, the apparatus body is configured to be switched to a third position in which the apparatus body reads the document using the reader and in which a projected area of the apparatus body on the mounting surface is larger than that in the second position, and the center of gravity of the apparatus body is lower than the rotation axis center of the apparatus body in the vertical direction viewed in the rotation axis direction of the apparatus body when the apparatus body is in the second position or in the third position regardless of an open/close state of the feed tray and the discharge tray.

According to the aspect, the center of gravity of the apparatus body is lower than the rotation axis center of the apparatus body in the vertical direction viewed in the rotation axis direction of the apparatus body when the apparatus body is in the second position or in the third position regardless of an open/close state of the feed tray and the discharge tray. Consequently, the apparatus body is stable with respect to the support section when the apparatus body is in the second position or in the third position regardless of an open/close state of the feed tray and the discharge tray.

According to a fourth aspect, in the first or second aspect, the apparatus body may include a pair of transport rollers disposed upstream of the reader in a straight document transport path on which the document is transported, the pair of transport rollers being configured to transport the document downstream, a feed roller disposed upstream of the pair of transport rollers in the document transport path, the feed roller being configured to feed the document downstream, a pair of discharge rollers disposed downstream of the reader, the pair of discharge rollers being configured to discharge the document, a first motor that is a drive source for the pair of transport rollers and the pair of discharge rollers, and a second motor that is a drive source for the feed roller, in which the apparatus body is configured to be switched to a third position in which the apparatus body reads a document using the reader and in which a projected area of the apparatus body on the mounting surface is larger than that in the second position, and the first motor and the second motor are lower than the rotation axis center of the apparatus body in the vertical direction viewed in the rotation axis direction of the apparatus body when the apparatus body is in the second position or in the third position.

In the image reading apparatus, the motors are heavy objects and are components that greatly affect the center of gravity of the apparatus. In the aspect, the first motor and the second motor are lower than the rotation axis center of the apparatus body in the vertical direction viewed in the rotation axis direction of the apparatus body when the apparatus body is in the second position or in the third position. Accordingly, the structure in which the center of gravity of the apparatus body in the vertical direction is equal to or lower than the rotation axis center of the apparatus body can be readily provided.

According to a fifth aspect, in the fourth aspect, the apparatus body may include a separation roller configured to nip and separate a document with the feeding roller, a background plate disposed at a position facing the reader, the background plate being configured to be switched between a facing state in which the background plate faces the reader and a non-facing state in which the background plate does not face the reader, a third motor that is a power source for switching the state of the background plate, and a fourth motor that is a drive source for the separation roller, in which the fourth motor is higher than the rotation axis center of the apparatus body in the vertical direction viewed in the rotation axis direction of the apparatus body when the apparatus body is in the second position or in the third position, and the third motor is lower than the rotation axis center of the apparatus body in the vertical direction viewed in the rotation axis direction of the apparatus body when the apparatus body is in the second position or in the third position.

According to the aspect, three motors of the four motors, that is, the first motor, the second motor, the third motor, and the fourth motor are vertically lower than the rotation axis center of the apparatus body viewed in the rotation axis direction of the apparatus body. Accordingly, the structure in which the center of gravity of the apparatus body in the vertical direction is equal to or lower than the rotation axis center of the apparatus body can be readily provided.

According to a sixth aspect, in the fourth or fifth aspect, the pair of transport rollers and the pair of discharge rollers may be lower than the rotation axis center of the apparatus body in the vertical direction viewed in the rotation axis direction of the apparatus body when the apparatus body is in the first position.

In the image reading apparatus, the pair of transport rollers and the pair of discharge rollers are heavy objects and are components that greatly affect the center of gravity of the apparatus. According to the aspect, the pair of transport rollers and the pair of discharge rollers are lower than the rotation axis center of the apparatus body in the vertical direction viewed in the rotation axis direction of the apparatus body when the apparatus body is in the first position, and thus the structure in which the center of gravity of the apparatus body in the vertical direction is equal to or lower than the rotation axis center of the apparatus body can be readily provided.

According to a seventh aspect, in the first or second aspect, the apparatus body may include a substrate on which electronic components are mounted, the apparatus body is configured to be switched to a third position in which the apparatus body reads a document using the reader, and in which a projected area of the apparatus body on the mounting surface is larger than that in the second position, and the substrate is lower than the rotation axis center of the apparatus body in the vertical direction viewed in the rotation axis direction of the apparatus body when the apparatus body is in the second position or in the third position.

In the image reading apparatus, the substrate on which electronic components are mounted is a heavy object and is a component that greatly affect the center of gravity of the apparatus. According to the aspect, the substrate is lower than the rotation axis center of the apparatus body in the vertical direction viewed in the rotation axis direction of the apparatus body when the apparatus body is in the second position or in the third position, and thus the structure in which the center of gravity of the apparatus body in the vertical direction is equal to or lower than the rotation axis center of the apparatus body can be readily provided.

An image reading apparatus according to an eighth aspect includes a support section in contact with a mounting surface on which the apparatus is mounted, an apparatus body including a reader configured to read a document, the apparatus body configured to be turnable with respect to the support section for position change, and a position holding section for holding a position of the apparatus body with respect to the support section, in which the apparatus body is configured to be switched between two different positions, and the center of gravity of the apparatus body in the vertical direction in the two positions is lower than a rotation shaft of the apparatus body viewed in the rotation axis direction of the apparatus body. According to the aspect, the center of gravity of the apparatus body in the two positions is lower than or equal to a rotation shaft of the apparatus body in the vertical direction viewed in the rotation axis direction of the apparatus body. Consequently, the apparatus body is stable with respect to the support section.

According to a ninth aspect, in the eighth aspect, the center of gravity of the apparatus body may overlap with the rotation shaft of the apparatus body viewed in the rotation axis direction of the apparatus body when the apparatus body is in one of the two positions, and the center of gravity of the apparatus body may be lower than the center of gravity in the one position when the apparatus body is in the other position of the two positions.

According to a tenth aspect, in the eighth or ninth aspect, the apparatus body may include a feed tray configured to support the document to be fed, and a discharge tray configured to support the document that is read and discharged, in which the feed tray and the discharge tray are configured to be switched between an open state and a closed state with respect to the apparatus body.

According to an eleventh aspect, in the tenth aspect, the center of gravity of the apparatus body may be lower than the rotation axis center of the apparatus body viewed in the rotation axis direction of the apparatus body when the apparatus body is in the one position with the feed tray and the discharge tray being opened or when the apparatus body is in the other position with the feed tray and the discharge tray being opened.

According to a twelfth aspect, in the eleventh aspect, the center of gravity of the apparatus body may be lower than the rotation axis center of the apparatus body viewed in the rotation axis direction of the apparatus body when the apparatus body is in the one position with the feed tray and the discharge tray being closed or when the apparatus body is in the other position with the feed tray and the discharge tray being closed.

According to a thirteenth aspect, in the twelfth aspect, the center of gravity of the apparatus body may move forward when the apparatus body is in the one position or in the other position and both of the feed tray and the discharge tray are opened from the closed state. According to the aspect, in a structure in which the center of gravity of the apparatus body moves forward when the apparatus body is in the one position or in the other position and both of the feed tray and the discharge tray are opened from a closed state, the apparatus body is stable with respect to the support section.

An image reading apparatus according to a fourteenth aspect includes a support section in contact with a mounting surface on which the apparatus is mounted, an apparatus body including a reader configured to read a document, the apparatus body being configured to be turnable with respect to the support section for position change, and a position holding section for holding a position of the apparatus body with respect to the support section, in which the apparatus body is configured to be switched between a first position in which the apparatus body does not read a document using the reader and a second position in which the apparatus body reads a document using the reader, the second position turned from the first position, and the center of gravity of the apparatus body is lower than or equal to a rotation axis center of the apparatus body in a vertical direction viewed in a rotation axis direction of the apparatus body when the apparatus body is in the first position or in the second position. According to the aspect, the center of gravity of the apparatus body is lower than or equal to a rotation axis center of the apparatus body in a vertical direction viewed in a rotation axis direction of the apparatus body when the apparatus body is in the first position or in the second position. Consequently, the apparatus body is stable with respect to the support section.

According to a fifteenth aspect, in the fourteenth aspect, the apparatus body may be configured to be switched to a third position in which the apparatus body reads a document using the reader and in which the apparatus body is turned from the second position in the same direction as the direction in which the apparatus body is turned from the first position to the second position, and the center of gravity of the apparatus body is lower than the rotation axis center of the apparatus body in the vertical direction viewed in the rotation axis direction of the apparatus body when the apparatus body is in the third position.

According to a sixteenth aspect, in the fifteenth aspect, the apparatus body may include a pair of transport rollers disposed upstream of the reader in a straight document transport path on which a document is transported, the pair of transport rollers being configured to transport the document downstream, a feed roller disposed upstream of the pair of transport rollers in the document transport path, the feed roller being configured to feed the document downstream, a pair of discharge rollers disposed downstream of the reader, the pair of discharge rollers being configured to discharge the document, a first motor that is a drive source for at least one of the pair of transport rollers and the pair of discharge rollers, and a second motor that is a drive source for the feed roller, in which a drive shaft of the first motor is lower than the rotation axis center of the apparatus body in the vertical direction viewed in the rotation axis direction of the apparatus body when the apparatus body is in the first position, in the second position, or in the third position.

According to a seventeenth aspect, in the sixteenth aspect, a drive shaft of the second motor may be higher than the rotation axis center of the apparatus body in the vertical direction viewed in the rotation axis direction of the apparatus body when the apparatus body is in the first position, and the drive shaft of the second motor may be lower than the rotation axis center of the apparatus body in the vertical direction viewed in the rotation axis direction of the apparatus body when the apparatus body is in the second position or in the third position.

According to an eighteenth aspect, in the sixteenth or seventeenth aspect, the apparatus body may include a background plate disposed at a position facing the reader, the background plate being configured to be switched between a facing state in which the background plate faces the reader and a non-facing state in which the background plate does not face the reader, and a third motor that is a power source for switching the state of the background plate, in which a drive shaft of the third motor is lower than the rotation axis center of the apparatus body in the vertical direction viewed in the rotation axis direction of the apparatus body when the apparatus body is in the first position, in the second position, or in the third position.

According to a nineteenth aspect, in any one of the sixteenth to eighteenth aspect, the apparatus body may include a separation roller configured to nip and separate a document with the feeding roller, and a fourth motor that is a drive source for the separation roller, in which a drive shaft of the fourth motor is higher than the rotation axis center of the apparatus body in the vertical direction viewed in the rotation axis direction of the apparatus body when the apparatus body is in the first position, in the second position, or in the third position.

According to a twentieth aspect, in any one of the fifteenth to nineteenth aspect, the apparatus body may include a substrate on which electronic components configured to control the reader are mounted, in which a part of the substrate is higher than the rotation axis center of the apparatus body in the vertical direction viewed in the rotation axis direction of the apparatus body when the apparatus body is in the first position, and the substrate is lower than the rotation axis center of the apparatus body in the vertical direction viewed in the rotation axis direction of the apparatus body when the apparatus body is in the second position or in the third position.

An image reading apparatus according to a twenty-first aspect includes a support section in contact with a mounting surface on which the apparatus is mounted, an apparatus body including a reader configured to read a document, the apparatus body configured to be turnable with respect to the support section for position change, and a position holding section for holding a position of the apparatus body with respect to the support section, in which the apparatus body is configured to be switched between two different positions in which the reader performs a document reading operation, and the center of gravity of the apparatus body is lower than a rotation shaft of the apparatus body viewed in the rotation axis direction of the apparatus body when the apparatus body is in one of the two positions. According to this aspect, when the apparatus body is in at least one of the two positions, the center of gravity of the apparatus body in the vertical is lower than a rotation axis center of the apparatus body viewed in the rotation axis direction of the apparatus body. Consequently, the apparatus body is stable with respect to the support section.

Hereinafter, an embodiment of the present disclosure will be described. In the following description, a scanner 1 that can read at least one of the front side and the back side of a document will be described as an example image reading apparatus. The scanner 1 is a document scanner that reads a document while transporting the document with respect to a reader.

In the X-Y-Z coordinate system in the drawings, an X-axis direction denotes an apparatus width direction and also denotes a document width direction. A rotation axis direction of an apparatus body 2, which will be described below, is parallel to the X-axis direction. A Y-axis direction denotes an apparatus depth direction and also denotes a direction in a horizontal direction. A Z-axis direction denotes a direction in a vertical direction that is orthogonal to the X-axis direction and the Y-axis direction. A V-axis direction is parallel to a document transport path, which will be described below, and an angle, especially an angle that is formed by the V-axis and the Y-axis varies depending on the position of the apparatus. Here, a +Y direction denotes a direction from an apparatus rear toward an apparatus front, and a −Y direction denotes a direction from the apparatus front toward the apparatus rear. When viewed from the apparatus front, the left denotes a +X direction and the right denotes a −X direction. In the following description, a direction (+V direction) in which a document is transported may be referred to as "downstream" and the opposite direction (−V direction) may be referred to as "upstream".

The scanner 1 in FIG. 1 to FIG. 4 includes an apparatus body 2 and a support section 5 that supports the apparatus body 2 such that the apparatus body 2 can be turned. The apparatus body 2 includes a lower unit 3 and an upper unit 4. The upper unit 4 can be turned about a rotation shaft (not illustrated) with respect to the lower unit 3 so as to be opened and closed. The upper unit 4 can be opened toward the apparatus front so as to expose a document transport path, which will be described below.

The lower unit 3 in the apparatus body 2 can be turned about a rotation shaft 5b with respect to arm sections 5a of the support section 5, thereby the position of the lower unit 3 can be changed. The arm sections 5a are each disposed on both sides of the apparatus body in the X-axis direction, and the apparatus body 2 is supported by the support section 5 on both sides in the X-axis direction. Straight line A1 in FIG. 1 denotes an axis center line of the rotation shaft 5b and is a rotation axis of the apparatus body 2. The rotation axis A1 according to the embodiment is a straight line that is parallel to the X axis.

Figure 4:
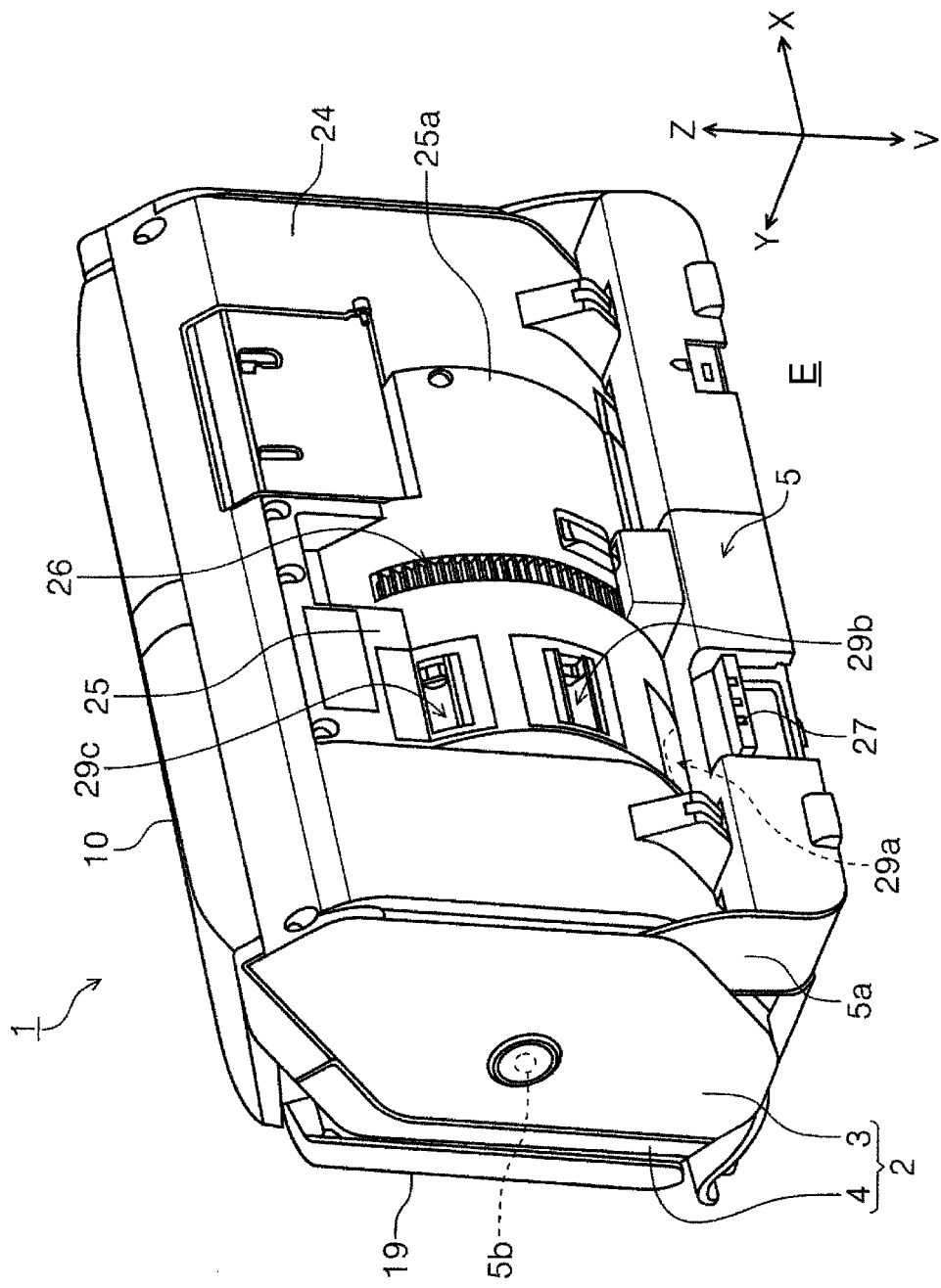
FIG. 4 is an external perspective view illustrating a scanner with a front cover and a top cover closed, viewed from the rear in a state in which an apparatus body is in a second position.
Figure 8:
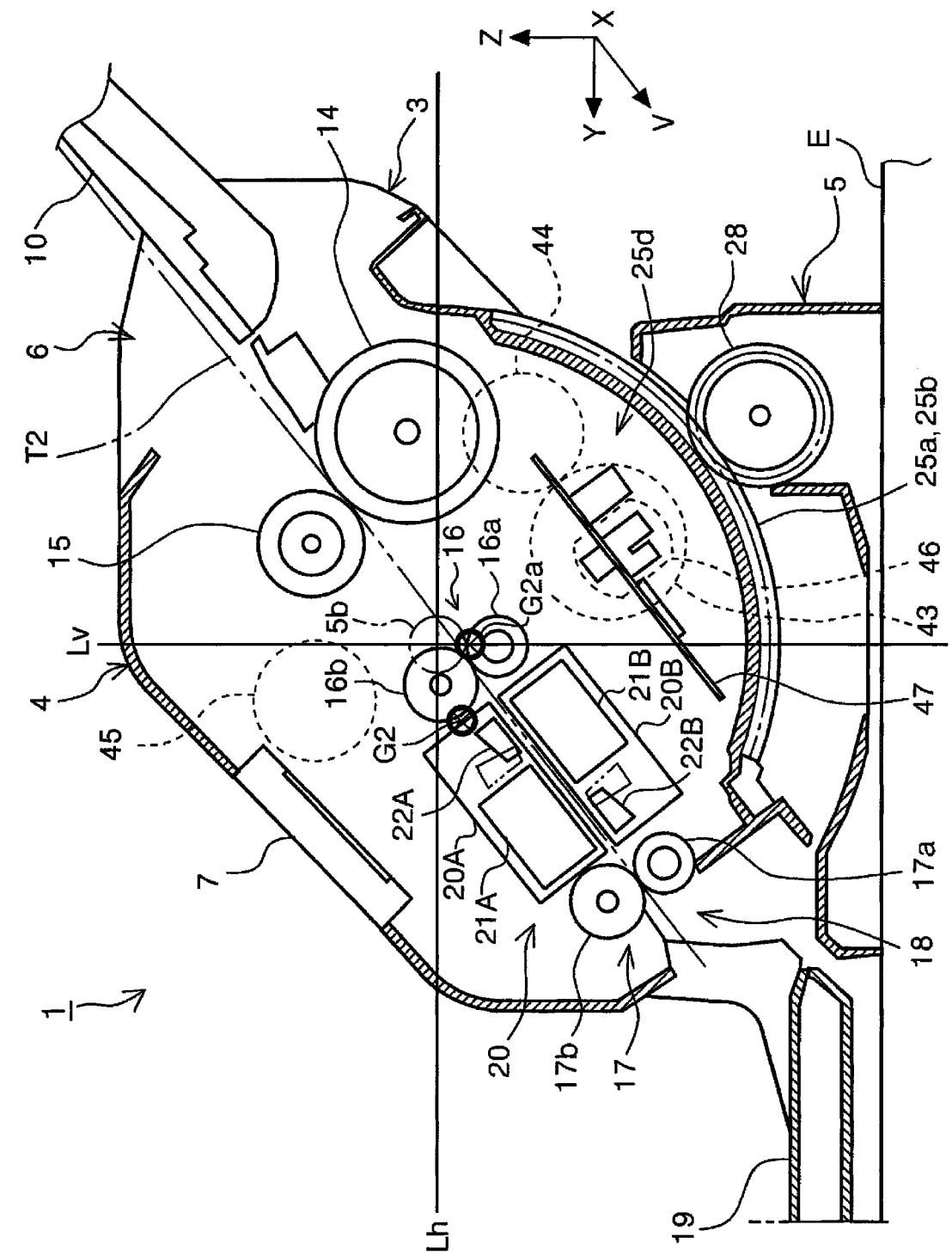
FIG. 8 illustrates a document transport path in a scanner with a front cover and a top cover open, viewed in the rotation axis direction of an apparatus body in a state in which the apparatus body is in a second position.
Figure 9:
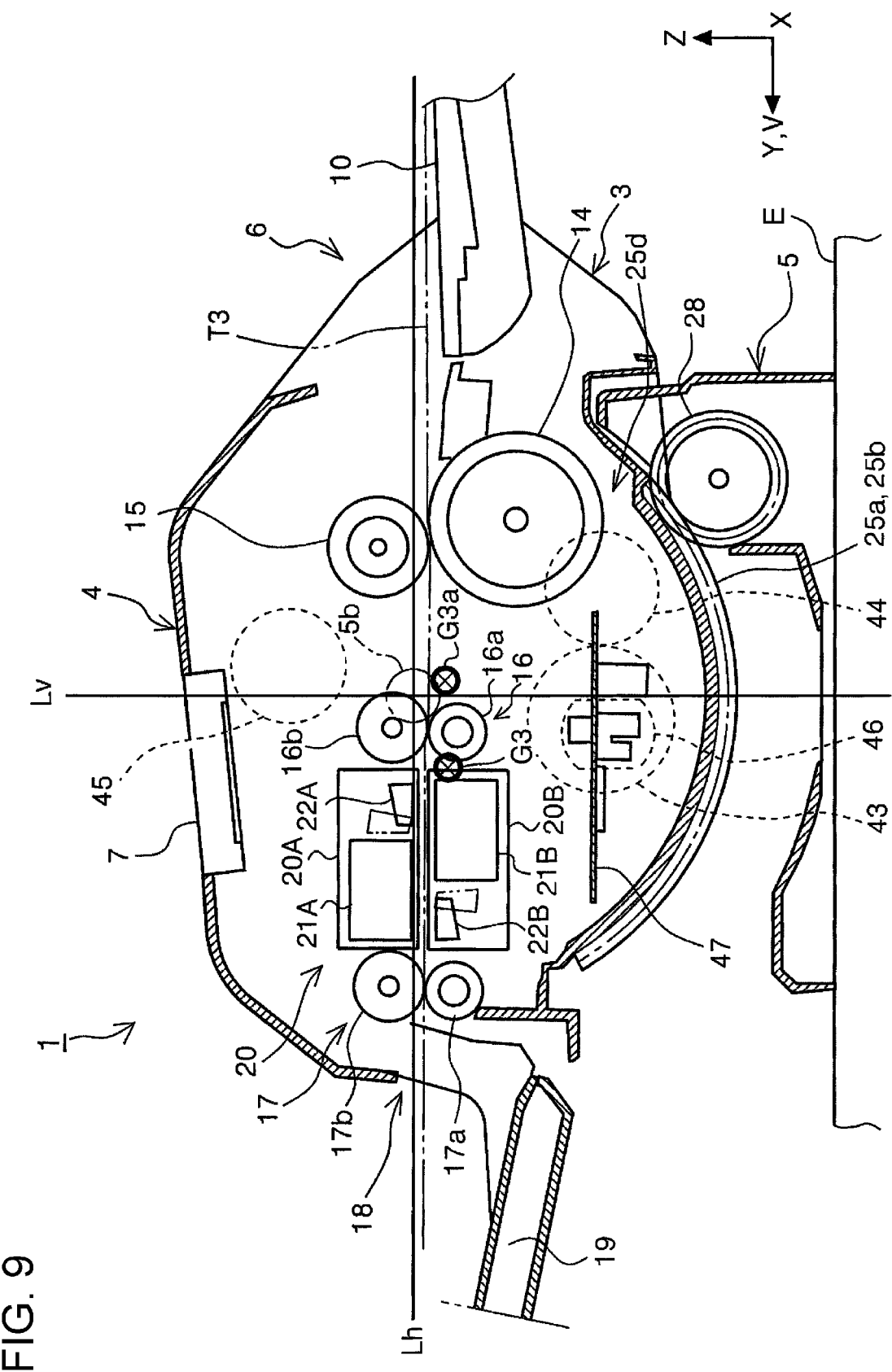
FIG. 9 illustrates a document transport path in a scanner with a front cover and a top cover open, viewed in the rotation axis direction of an apparatus body in a state in which the apparatus body is in a third position.
Figure 10:
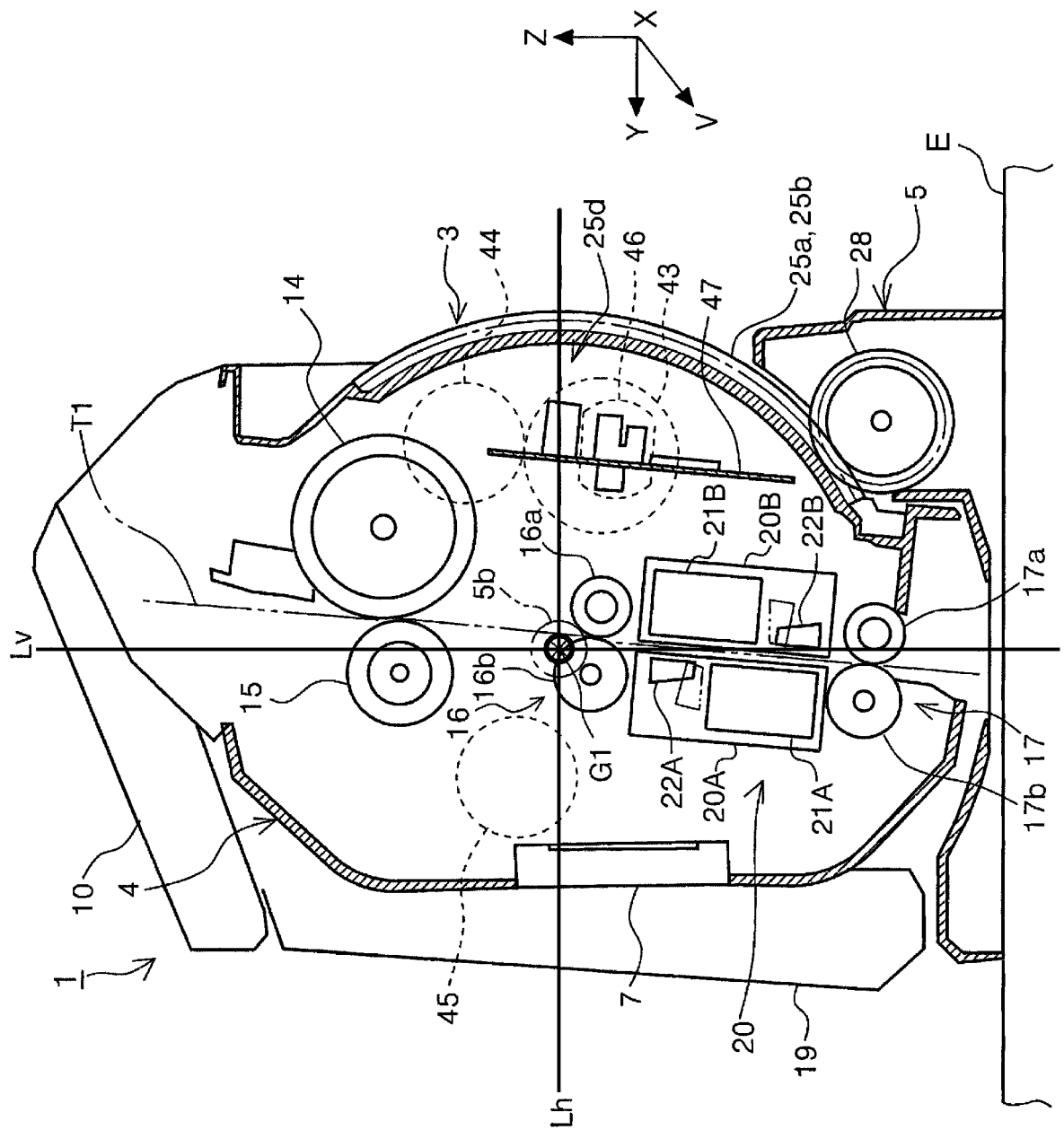
FIG. 10 illustrates a document transport path in a scanner with a front cover and a top cover closed, viewed in the rotation axis direction of an apparatus body in a state in which the apparatus body is in a first position.

An outer shell of the lower unit 3 has a first housing 24 and a second housing 25 as illustrated in FIG. 4. The second housing 25 has an arch portion 25a that has a shape along a rotational trajectory of the lower unit 3. A rack 26 is disposed in the arch portion 25a and engages with a pinion gear 28 disposed in the support section 5 as illustrated in FIG. 8 to FIG. 10. The pinion gear 28 receives a rotational load from a damper mechanism (not illustrated), and the rotational load reduces the turning speed when the lower unit 3 is turned, that is, when the position of the apparatus body 2 is changed.

The apparatus body 2 of the scanner 1 according to the embodiment can be held in one of three positions by a position holding section, which will be described below. The three positions include two positions in which the apparatus body 2 is held for document reading and one position in which the apparatus body 2 is not in use. The positions illustrated in FIG. 1, FIG. 2, and FIG. 6 to FIG. 9 are used when the apparatus body 2 is held for document reading, whereas the position illustrated in FIG. 3, FIG. 4, and FIG. 10 is used when the apparatus body 2 is not in use. The position illustrated in FIG. 3, FIG. 4, and FIG. 10 is an example first position. The positions for document reading include the position illustrated in FIG. 1, FIG. 2, FIG. 6, and FIG. 8, which are example second position, and the position illustrated in FIG. 7 and FIG. 9, which are example third position. A projected area of the scanner 1 on a mounting surface E is the smallest when the apparatus body 2 is in the first position, and more specifically, a space occupied in the Y-axis direction is the smallest. A projected area of the scanner 1 on the mounting surface E is the largest when the apparatus body 2 is in the third position.

The first position and the second position of the apparatus body 2 are example different two positions, and when one position is the first position, the other position is the second position, or when one position is the second position, the other position is the first position. In another case, the first position and the third position of the apparatus body 2 are example two different positions, and when one position is the first position, the other position is the third position, or when one position is the third position, the other position is the first position. Still in another case, the second position and the third position of the apparatus body 2 are example two different positions, and when one position is the second position, the other position is the third position, or when one position is the third position, the other position is the second position. The positions of the apparatus body 2 can be detected by a position detector (not illustrated).

Figure 5:
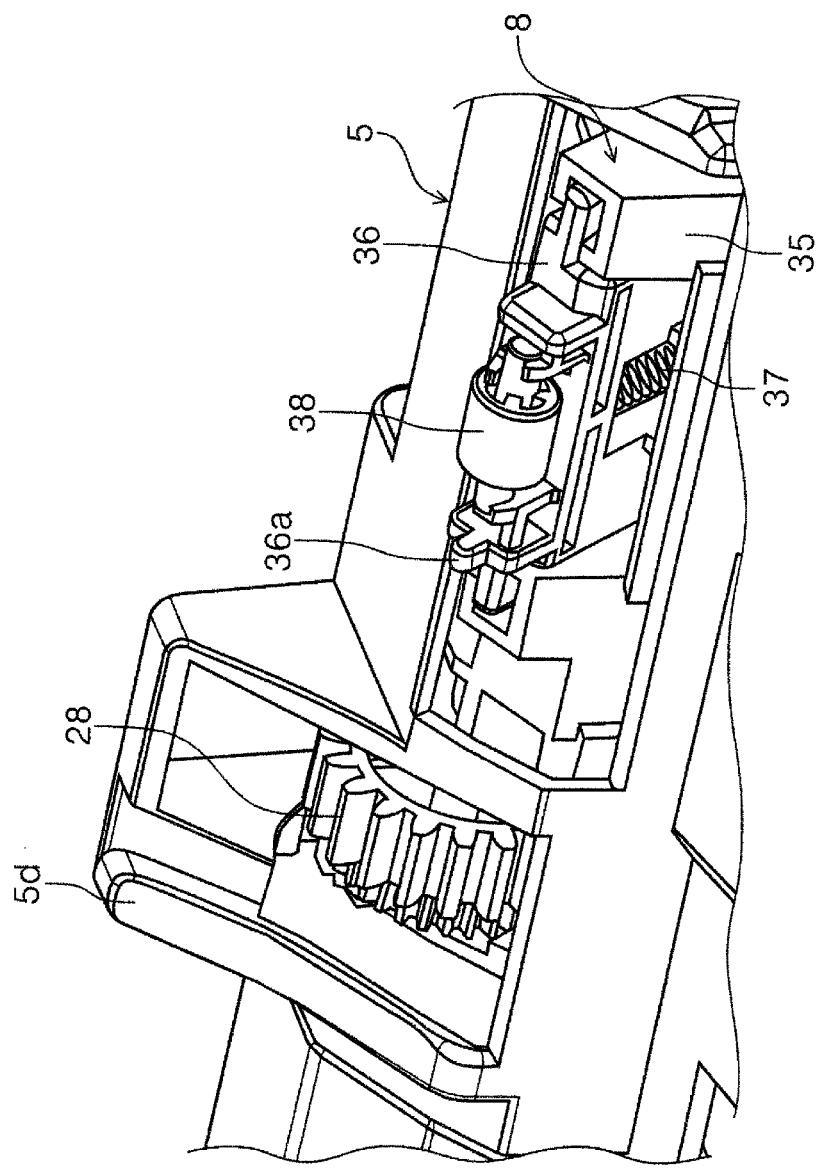
FIG. 5 is a perspective view of an advancing/retracting unit.

Here, a position holding section for holding the apparatus body 2 in a position is described. The position holding section includes a first recessed portion 29a, a second recessed portion 29b, and a third recessed portion 29c illustrated in FIG. 4 and an advancing/retracting unit 8 illustrated in FIG. 5. The first recessed portion 29a, the second recessed portion 29b, and the third recessed portion 29c illustrated in FIG. 4 are provided at intervals along a circumference of the arch portion 25a of the second housing 25. The advancing/retracting unit 8 illustrated in FIG. 5 includes a base section 35, a slider unit 36, a spring 37, and an operation lever 27 (see FIG. 4). The slider unit 36 is disposed such that the position of the slider unit 36 can be changed in an advancing/retracting direction in the base section 35 with respect to the arch portion 25a. The spring 37 presses the slider unit 36 against the arch portion 25a. The operation lever 27 is used for the slider unit 36 to be retracted away from the arch portion 25a against the spring force of the spring 37.

The slider unit 36 includes a driven roller 38. The driven roller 38 is a freely rotatable roller and can be brought into contact with the surface of the arch portion 25a illustrated in FIG. 4 when the position of the apparatus body 2 is changed, and can be fitted into one of the first recessed portion 29a, the second recessed portion 29b, and the third recessed portion 29c to hold the position of the apparatus body 2. More specifically, the driven roller 38 is fitted into the first recessed portion 29a illustrated in FIG. 4 to hold the apparatus body 2 in the first position, is fitted into the second recessed portion 29b in FIG. 4 to hold the apparatus body 2 in the second position, and is fitted into the third recessed portion 29c in FIG. 4 to hold the apparatus body 2 in the third position. The spring 37 in FIG. 5 presses the driven roller 38 against the individual recessed portions. The operation lever 27 in FIG. 4 is operated to release a position holding state of the apparatus body 2. By the operation, the slider unit 36 is moved downward, the driven roller 38 is retracted away from the corresponding recessed portion, and the apparatus body 2 becomes freely rotatable, thereby enabling position change.

The upper unit 4 includes a front cover 19 that functions as a "discharge tray" as illustrated in FIG. 1 to FIG. 4. The lower unit 3 includes a top cover 10 that functions as a "feed tray". The front cover 19 can be turned with respect to the upper unit 4 to a closed position as illustrated in FIG. 1, FIG. 3, FIG. 4. and FIG. 10 or to an open position as illustrated in FIG. 2, and FIG. 6 to FIG. 9. When the front cover 19 is open, it functions as a discharge tray for receiving a document that is read and discharged.

Figure 2:
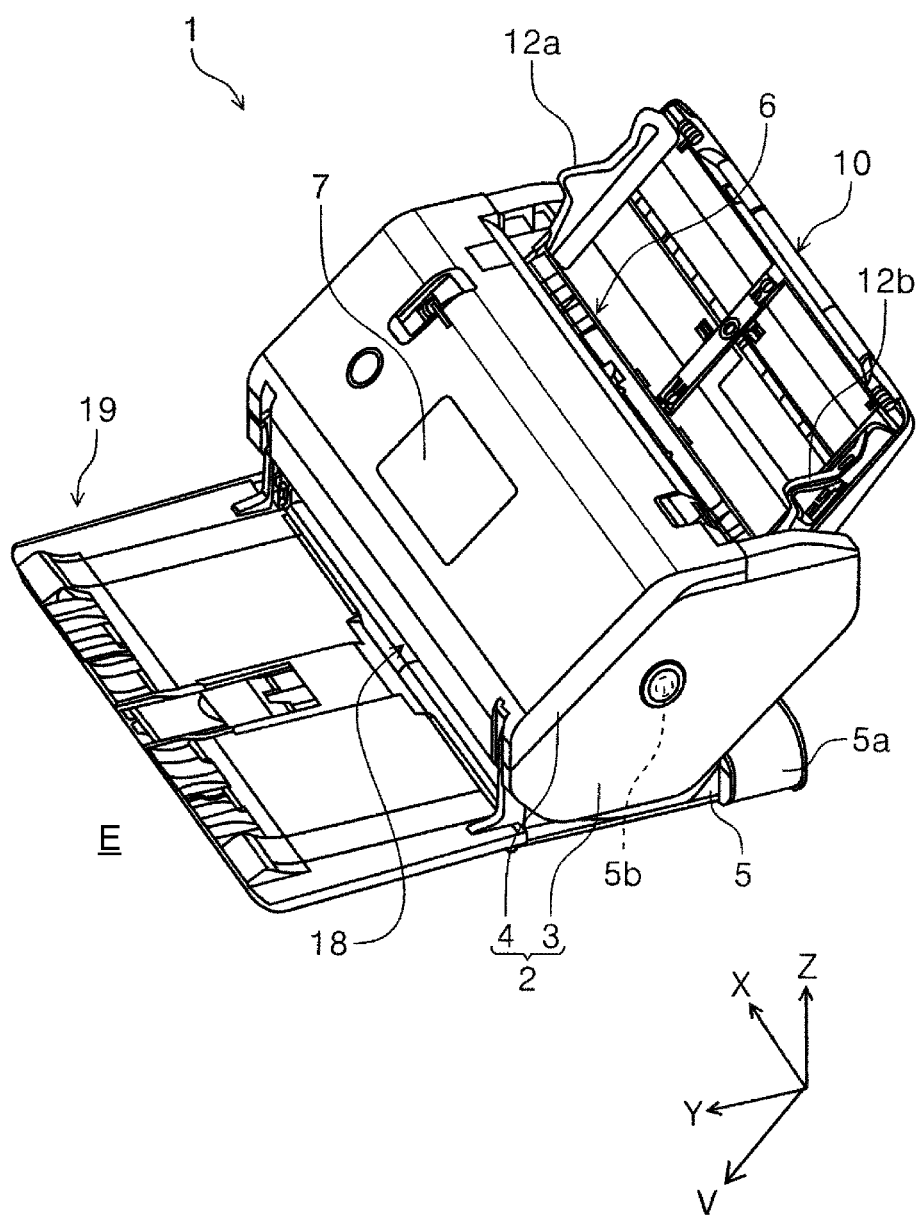
FIG. 2 is an external perspective view illustrating a scanner with a front cover and a top cover open, viewed from the front in a state in which an apparatus body is in a second position.
Figure 3:
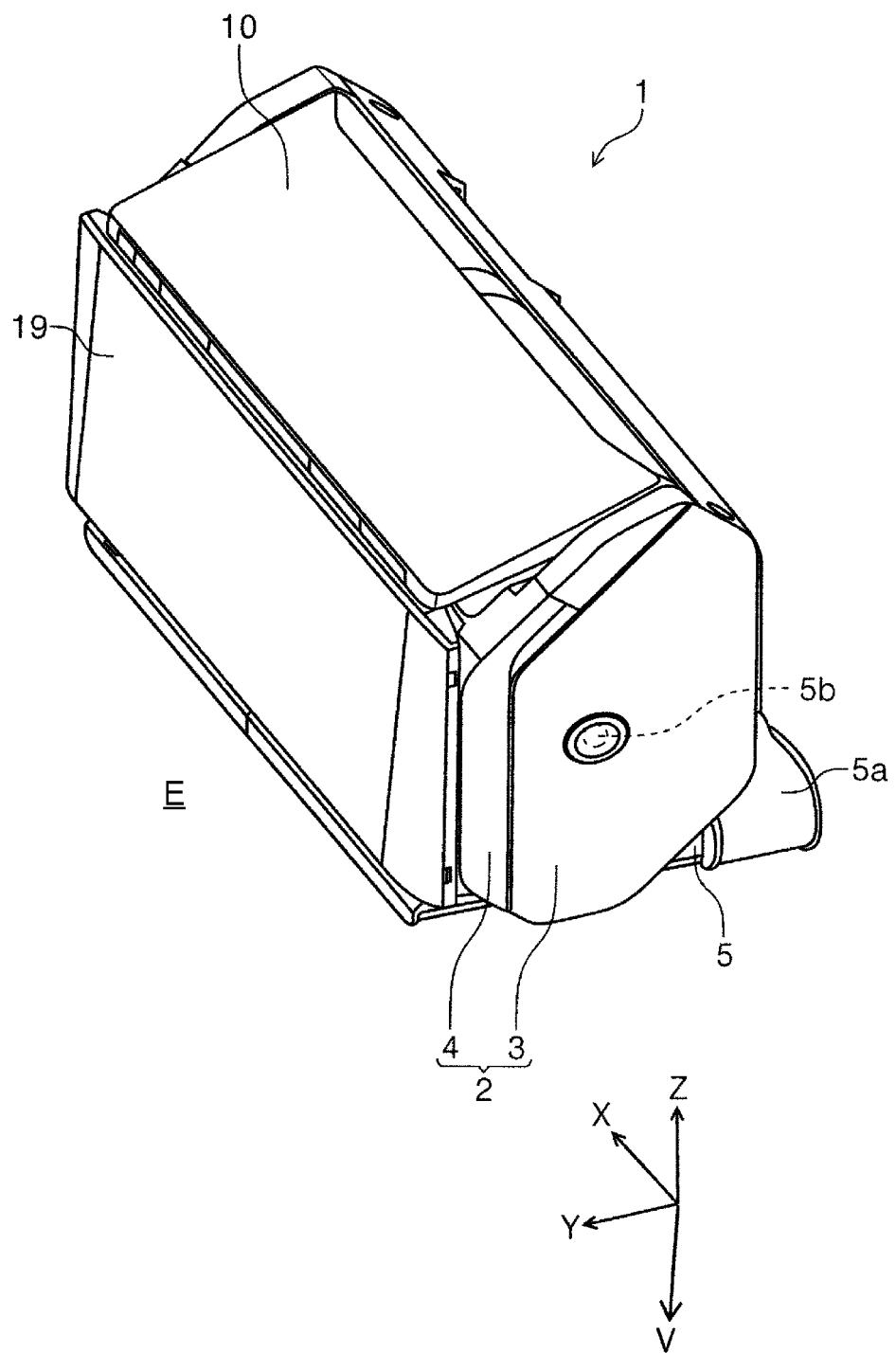
FIG. 3 is an external perspective view illustrating a scanner with a front cover and a top cover closed, viewed from the front in a state in which an apparatus body is in a first position.

The upper unit 4 has an operation panel 7 on an upper surface as illustrated in FIG. 2. On the operation panel 7, a user interface (UI) for setting various settings for reading, for executing a reading operation, for displaying reading setting contents, or the like can be implemented. The operation panel 7 according to the embodiment is a touch panel through which both of a displaying operation and an inputting operation can be performed. The operation panel 7 functions as an operation section for performing various operations and also functions as a display section for displaying various kinds of information. The operation panel 7 is exposed by opening the front cover 19.

The top cover 10 that is provided to the lower unit 3 can be turned with respect to the lower unit 3 to a closed position as illustrated in FIG. 1, FIG. 3, FIG. 4, and FIG. 10 or to an open position as illustrated in FIG. 2, and FIG. 6 to FIG. 9. When the top cover 10 is open, it functions as a feed tray for supporting a document to be fed. In FIG. 2, edge guides 12a and 12b guide side edges of a document. A feed slot 6 that is contiguous to the inside of the apparatus body 2 is provided in an upper portion of the apparatus body 2. A document mounted on the top cover 10 is fed from the feed slot 6 into the apparatus body 2.

Next, a document transport path in the scanner 1 will be described mainly referring to FIG. 8 to FIG. 10. A straight document transport path T2 illustrated in FIG. 8 is a document transport path that is used when the apparatus body 2 is in the second position. A straight document transport path T3 illustrated in FIG. 9 is a document transport path that is used when the apparatus body 2 is in the third position. A straight document transport path T1 illustrated in FIG. 10 is a document transport path that is used when the apparatus body 2 is in the first position. It should be noted that the first position of the apparatus body 2 illustrated in FIG. 10 is a position in which the apparatus body 2 is not in use, and no document is actually transported in this position. The document transport path is closest to the vertical when the apparatus body 2 is in the first position illustrated in FIG. 10, and is closest to the horizontal when the apparatus body 2 is in the third position illustrated in FIG. 9. In the following description, the document transport paths T1, T2, and T3 may be referred to as a document transport path T when it is not particularly necessary to distinguish the individual document transport paths.

The document transport path T is a substantially straight document transport path defined by the lower unit 3 and the upper unit 4. Although not illustrated, a transport path is defined by the lower unit 3 and the upper unit 4 from a roller pair that consists of a feed roller 14 and a separation roller 15 to a pair of transport rollers 16. The top cover 10 is disposed most upstream of the document transport path T. The feed roller 14, which feeds documents mounted on the top cover 10 downstream, and the separation roller 15, which nips and separates the documents with the feed roller 14 therebetween are disposed downstream of the top cover 10 on the document transport path T. The feed roller 14 comes into contact with the lowermost document of documents mounted on the top cover 10. Accordingly, when a plurality of sheets of documents is mounted on the top cover 10, the documents are sequentially fed from the lowermost document downstream.

The feed roller 14 rotates in the counterclockwise direction in FIG. 8 in response to a rotation torque from a second motor 44. The rotation torque for rotating the separation roller 15 in the counterclockwise direction in FIG. 8 is transmitted from a fourth motor 45 through a torque limiter (not illustrated).

When no document is provided or only one document is provided between the feed roller 14 and the separation roller 15, a slippage will occur in the torque limiter (not illustrated), and then the separation roller 15 rotates in the clockwise direction in FIG. 8 as the feed roller 14 rotates regardless of the rotation torque from the fourth motor 45. In addition to a document to be fed, when another document and subsequent documents are fed between the feed roller 14 and the separation roller 15, a slippage will occur between the documents, and then the separation roller 15 rotates in the counterclockwise direction in FIG. 8 with the rotation torque from the fourth motor 45. This rotation prevents or reduces multi-sheet feeding of the documents.

The pair of transport rollers 16, a reader 20 for reading document images, and a pair of discharge rollers 17 are disposed downstream of the feeding roller 14. The pair of transport rollers 16 includes a transport driving roller 16a that is driven by a first motor 43 and a transport driven roller 16b that is driven to rotate. A document that is nipped by the feed roller 14 and the separation roller 15 is fed downstream, the document is nipped by the pair of transport rollers 16, and is transported to a position at which the document faces an upper sensor unit 20A and a lower sensor unit 20B, which are disposed downstream of the pair of transport rollers 16.

The reader 20 includes the upper sensor unit 20A and the lower sensor unit 20B. The upper sensor unit 20A is disposed in the upper unit 4 and above the document transport path T, and the lower sensor unit 20B is disposed in the lower unit 3 and below the document transport path T. The upper sensor unit 20A includes a sensor module 21A and the lower sensor unit 20B includes a sensor module 21B. The sensor modules 21A and 21B function as a contact image sensor (CIS) module (CISM). The sensor module 21A that is disposed above the document transport path T reads an upper surface of a document, whereas the sensor module 21B that is disposed below the document transport path T reads a lower surface of a document. A document reading surface (not illustrated) implemented by the upper sensor unit 20A and a document reading surface (not illustrated) implemented by the lower sensor unit 20B are parallel to the document transport path T.

The upper sensor unit 20A includes a background plate 22A that is disposed to face the sensor module 21B in the lower sensor unit 20B whereas the lower sensor unit 20B includes a background plate 22B that is disposed to face the sensor module 21A in the upper sensor unit 20A. The background plates 22A and 22B are used for shading correction and function as reference plates that are read by the respective sensor modules that face to each other. The background plates are, for example, resin plates of white, gray, black, or the like or metal plates coated in white, gray, black or the like.

The background plates 22A and 22B can be turned by the power of a third motor 46, and turning the background plates 22A and 22B switches them between a facing state in which the background plates 22A and 22B face the respective facing sensor modules as illustrated in the solid lines and a non-facing state in which the facing state is released as illustrated in the chain double-dashed lines. The background plates 22A and 22B are, for example, white, and in such a case white reference value can be acquired in the facing state and a black reference value can be acquired in the non-facing state.

After an image on at least one of the upper surface and the lower surface of a document is read in the reader 20, the document is nipped by the pair of discharge rollers 17 that is disposed downstream of the reader 20 and is discharged from a discharge slot 18. The pair of discharge rollers 17 includes a discharge driving roller 17a that is driven by the first motor 43 and a discharge driven roller 17b that is driven to rotate.

In FIG. 8 to FIG. 10, a main board 47 is a substrate on which electronic components are mounted. The main board 47 functions as a controller for performing various control processes in the scanner 1 such as a reading control process for the reader 20, a feeding control process, a transport control process, and the like using the electronic components. The main board 47 is disposed in a position along the document transport path T. In this embodiment, the second housing 25 (see FIG. 4), which functions as the outer shell of the lower unit 3, includes the arch portion 25a along a rotational trajectory of the lower unit 3 at a position facing the support section 5 and the main board 47 that is disposed in a space 25d inside the arch portion 25a. This structure enables an effective use of the space inside the housing, reducing the size of the apparatus.

Figure 6:
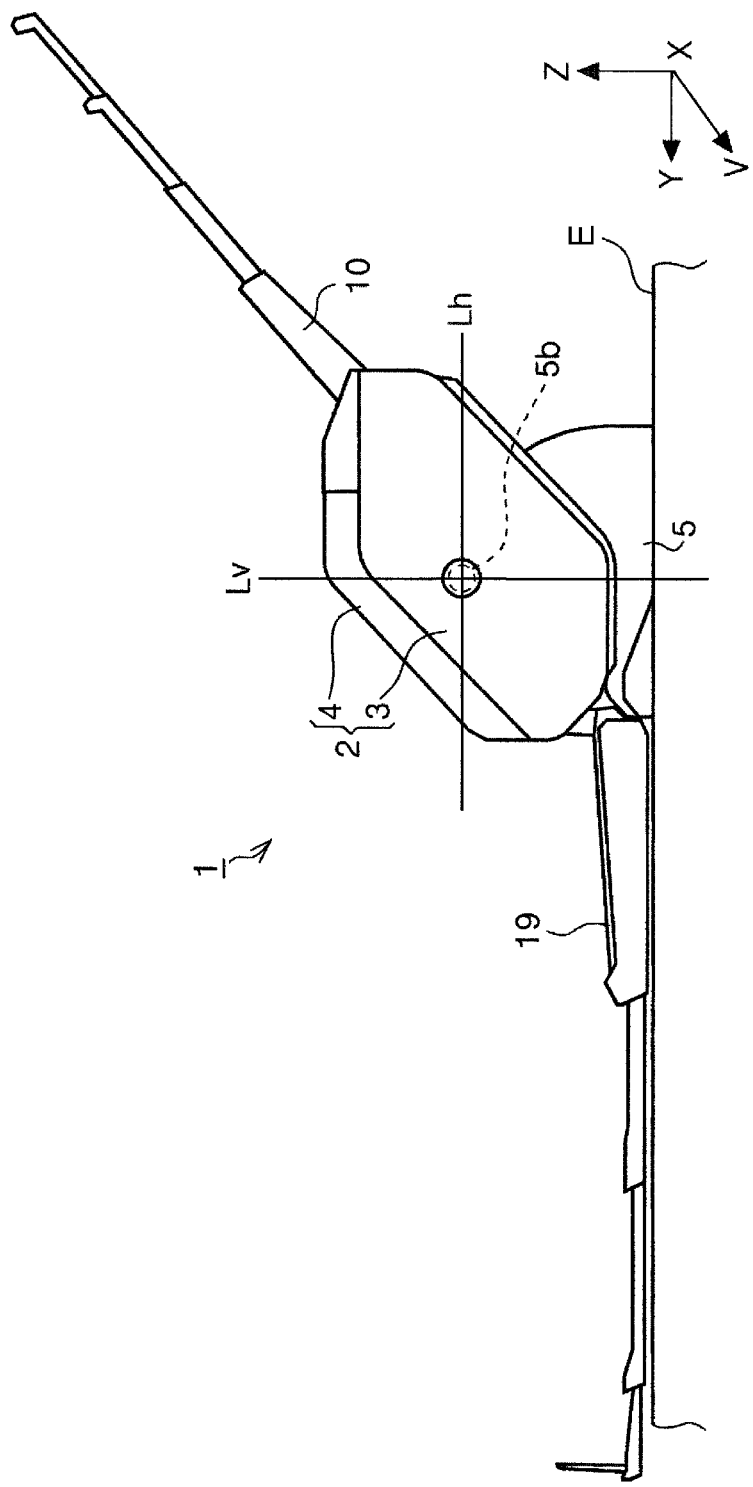
FIG. 6 illustrates a scanner with a front cover and a top cover open, viewed in the rotation axis direction of an apparatus body in a state in which the apparatus body is in a second position.
Figure 7:
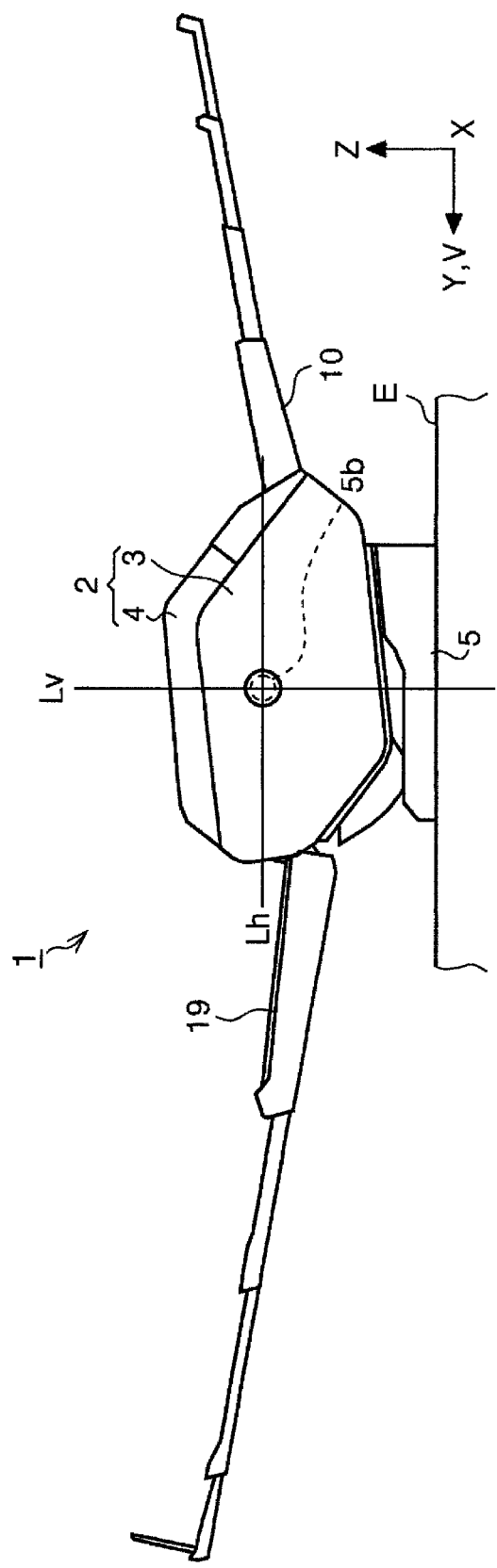
FIG. 7 illustrates a scanner with a front cover and a top cover open, viewed in the rotation axis direction of an apparatus body in a state in which the apparatus body is in a third position.

Next, the position of the center of gravity of the apparatus body 2 will be described. Here, the apparatus body 2 does not include the support section 5, and thus the support section 5 does not affect the position of the center of gravity of the apparatus body 2. All components except the support section 5 are components of the apparatus body 2. FIG. 6 and FIG. 7 illustrate the front cover 19, which function as a discharge tray, and the top cover 10, which functions as a feed tray, in an open state. Line Lh is a horizontal line extending through an axis center position of the rotation shaft 5b, and line Lv is a vertical line extending through an axis center position of the rotation shaft 5b. FIG. 8 to FIG. 13 illustrate horizontal line Lh and vertical line Lv.

FIG. 8 illustrates the center of gravity G2 of the apparatus body 2 when the apparatus body 2 is in the second position and the front cover 19 and the top cover 10 are open. The second position is used in a state in which a reading operation is performed using the reader 20 or the reader 20 is used. The center of gravity G2 is lower than horizontal line Lh in the vertical direction and is closer to the apparatus front side than vertical line Lv in the horizontal direction (Y-axis direction) as illustrated in FIG. 8 when viewed in the rotation axis direction of the apparatus body 2. In addition, the center of gravity G2 is lower than the rotation axis center of the apparatus body 2 in the vertical direction. It should be noted that the center of gravity G2 may be lower than the rotation shaft 5b of the apparatus body 2 in the vertical direction.

The center of gravity G2a of the apparatus body 2 is a position when the apparatus body 2 is in the second position and the front cover 19 and the top cover 10 are not open but closed. The center of gravity G2a is lower than horizontal line Lh in the vertical direction and is on vertical line Lv in the horizontal direction (Y-axis direction) as illustrated in FIG. 8 when viewed from the rotation axis direction of the apparatus body 2. The center of gravity G2a is lower than the rotation axis center of the apparatus body 2 in the vertical direction. It should be noted that the center of gravity G2a may be lower than the rotation shaft 5b of the apparatus body 2 in the vertical direction. When the front cover 19 and the top cover 10 are opened from the closed state, the center of gravity of the apparatus body 2 moves toward the apparatus front side by the change from the center of gravity G2a to the center of gravity G2 as illustrated in FIG. 8.

FIG. 9 illustrates the center of gravity G3 of the apparatus body 2 when the apparatus body 2 is in the third position and the front cover 19 and the top cover 10 are open. The third position is used in a state in which a document reading operation is performed using the reader 20 or the reader 20 is used. The center of gravity G3 is lower than horizontal line Lh in the vertical direction and is closer to the apparatus front side than vertical line Lv in the horizontal direction (Y-axis direction) when viewed in the rotation axis direction of the apparatus body 2 as illustrated in FIG. 9. The center of gravity G3 is lower than the rotation axis center of the apparatus body 2 in the vertical direction. It should be noted that the center of gravity G3 may be lower than the rotation shaft 5b of the apparatus body 2 in the vertical direction.

The center of gravity G3a of the apparatus body 2 is a position when the apparatus body 2 is in the third position and the front cover 19 and the top cover 10 are not open but closed. The center of gravity G3a is lower than horizontal line Lh in the vertical direction and is closer to the apparatus rear side than vertical line Lv in the horizontal direction (Y-axis direction) when viewed in the rotation axis direction of the apparatus body 2 as illustrated in FIG. 9. The center of gravity G3a is lower than the rotation axis center of the apparatus body 2 in the vertical direction. It should be noted that the center of gravity G3a may be lower than the rotation shaft 5b of the apparatus body 2 in the vertical direction. When the front cover 19 and the top cover 10 are opened from the closed state, the center of gravity of the apparatus body 2 moves toward the apparatus front side by the change from the center of gravity G3a to the center of gravity G3 as illustrated in FIG. 9.

FIG. 10 illustrates the center of gravity G1 of the apparatus body 2 when the apparatus body 2 is in the first position and the front cover 19 and the top cover 10 are closed. The first position is used in a state in which a document reading operation is not performed using the reader 20, in a state in which the front cover 19, which function as a discharge tray, and the top cover 10, which functions as a feed tray, are closed, or in a state in which the reader 20 is not in use. The center of gravity G1 is within the area of the rotation shaft 5b of the apparatus body 2 viewed in the rotation axis direction of the apparatus body 2 as illustrated in FIG. 10. The center of gravity G1 may be on horizontal line Lh in the vertical direction, and may be on the rotation axis center of the apparatus body 2 on vertical line Lv in the horizontal direction (Y-axis direction). It should be noted that the center of gravity G1 may be any point within the area of the rotation shaft 5b and equal to or lower than the rotation axis center in the vertical direction. The first position of the apparatus body 2 is used when the apparatus body 2 is not in use. When the apparatus body 2 is in the first position, the front cover 19 and the top cover 10 are not open. Accordingly, in FIG. 10, the center of gravity of the apparatus body 2 in the state in which the apparatus body 2 is in the first position and the front cover 19 and the top cover 10 are open is not illustrated.

In this embodiment, although the center of gravity of the apparatus body 2 in the X-axis direction is not illustrated, the center of gravity of the apparatus body 2 is at a central point in the X-axis direction regardless of the position of the apparatus body 2 and regardless of an open/close state of the front cover 19 and the top cover 10.

As described above, the center of gravity of the apparatus body 2 in the vertical direction viewed in the rotation axis direction of the apparatus body 2 is equal to or lower than the rotation axis center of the apparatus body 2 at least when the apparatus body 2 is in the first position (see FIG. 10) or in the second position (see FIG. 8), enabling the stable apparatus body 2 with respect to the support section 5.

In this embodiment, when the apparatus body 2 is in the third position (see FIG. 9), the center of gravity of the apparatus body 2 is equal to or lower than the rotation axis center of the apparatus body 2 in the vertical direction. In addition, in this embodiment, at all positions during the position change of the apparatus body 2 between the first position (FIG. 10) and the third position (FIG. 9), the center of gravity of the apparatus body 2 is equal to or lower than the rotation axis center of the apparatus body in the vertical direction. This structure, however, is not limited to this example and the center of gravity of the apparatus body 2 may be temporarily in a position higher than the rotation axis center of the apparatus body 2 in the vertical direction while the apparatus body 2 is changing the position.

In this embodiment, the center of gravity of the apparatus body 2 in the vertical direction viewed in the rotation axis direction of the apparatus body 2 is lower than the rotation axis center of the apparatus body 2 when the apparatus body 2 is in the second position (see FIG. 8) or in the third position (see FIG. 9). In addition, when the apparatus body 2 is in the first position (see FIG. 10), the center of gravity of the apparatus body 2 corresponds to the rotation axis center of the apparatus body 2. However, the center of gravity of the apparatus body 2 in the vertical direction may correspond to the rotation axis center of the apparatus body 2 when the apparatus body 2 is in the second position (see FIG. 8) or in the third position (see FIG. 9), or may be lower than the rotation axis center of the apparatus body 2 when the apparatus body 2 is in the first position (see FIG. 10).

In other words, in the above-described structure, the apparatus body 2 can be positioned in one of two different positions, and in each of the two positions, the center of gravity of the apparatus body 2 in the vertical direction is equal to or lower than the rotation shaft 5b of the apparatus body 2 viewed in the rotation axis direction of the apparatus body 2. The two different positions may be any two positions of the first position, the second position, and the third position. In this embodiment, when one of the two different positions is the first position and the other one is the second position or the third position, in the first position, the center of gravity of the apparatus body 2 viewed in the rotation axis direction of the apparatus body 2 corresponds to the rotation shaft 5b of the apparatus body 2. On the other hand, in the second position or in the third position, the center of gravity of the apparatus body 2 viewed in the rotation axis direction of the apparatus body 2 is lower than the center of gravity in the first position.

In this embodiment, although the center of gravity of the apparatus body 2 in the horizontal direction (Y-axis direction) viewed in the rotation axis direction of the apparatus body 2 is closer to the apparatus front side than vertical line Lv when the front cover 19 and the top cover 10 are open and when the apparatus body 2 is in the second position (see FIG. 8) or in the third position (see FIG. 9), the center of gravity of the apparatus body 2 in the horizontal direction (Y-axis direction) viewed in the rotation axis direction of the apparatus body 2 may be on vertical line Lv or closer to the apparatus rear side than vertical line Lv. In addition, although the center of gravity of the apparatus body 2 in the horizontal direction (Y-axis direction) is on vertical line Lv when the front cover 19 and the top cover 10 are closed and when the apparatus body 2 is in the second position (see FIG. 8), the center of gravity of the apparatus body 2 in the horizontal direction (Y-axis direction) may be closer to the apparatus front side than vertical line Lv or closer to the apparatus rear side than vertical line Lv. In addition, although the center of gravity of the apparatus body 2 in the horizontal direction (Y-axis direction) is closer to the apparatus rear side than vertical line Lv when the front cover 19 and the top cover 10 are closed and when the apparatus body 2 is in the third position (see FIG. 9), the center of gravity of the apparatus body 2 in the horizontal direction (Y-axis direction) may be on vertical line Lv or may be closer to the apparatus front side than vertical line Lv. In addition, although the center of gravity of the apparatus body 2 in the horizontal direction (Y-axis direction) is on vertical line Lv when the front cover 19 and the top cover 10 are closed and when the apparatus body 2 is in the first position (see FIG. 10), the center of gravity of the apparatus body 2 in the horizontal direction (Y-axis direction) may be closer to the apparatus front side than vertical line Lv or closer to the apparatus rear side than vertical line Lv.

As illustrated in FIG. 10, when the apparatus body 2 is in the first position, the center of gravity G1 of the apparatus body 2 viewed in the rotation axis direction of the apparatus body 2 corresponds to the rotation axis center of the apparatus body 2, that is, the position at which horizontal line Lh and vertical line Lv intersect. Accordingly, no rotation moment is produced in the apparatus body 2 when the apparatus body 2 is in the first position, enabling the more stable apparatus body 2 with respect to the support section 5.

The center of gravity of the apparatus body 2 in the vertical direction is lower than the rotation axis center of the apparatus body 2 viewed in the rotation axis direction of the apparatus body 2 when the apparatus body 2 is in the second position (see FIG. 8) or in the third position (see FIG. 9) regardless of an open/close state of the top cover 10, which functions as a feed tray, and the front cover 19, which functions as a discharge tray. Accordingly, the apparatus body 2 is stable with respect to the support section 5 when the apparatus body 2 is in the second position or in the third position regardless of an open/close state of the top cover 10 and the front cover 19. The projected area of the scanner 1 on the mounting surface E when the apparatus body 2 is in the third position is larger than that in the second position in a state in which both the front cover 19 and the top cover 10 are closed or in a state in which the front cover 19 and the top cover 10 are opened to the maximum respectively.

The first motor 43 and the second motor 44 are vertically lower than the rotation axis center of the apparatus body 2 viewed in the rotation axis direction of the apparatus body 2 when the apparatus body 2 is in the second position (see FIG. 8) or in the third position (see FIG. 9). Here, the motors are heavy objects in the scanner 1 and are components that greatly affect the center of gravity of the apparatus. As described above, since the first motor 43 and the second motor 44 are vertically lower than the rotation axis center of the apparatus body 2 viewed in the rotation axis direction of the apparatus body 2, the structure in which the center of gravity of the apparatus body 2 in the vertical direction is equal to or lower than the rotation axis center of the apparatus body 2 can be readily provided.

The fourth motor 45 is vertically higher than the rotation axis center of the apparatus body 2 viewed in the rotation axis direction of the apparatus body 2 when the apparatus body 2 is in the second position (see FIG. 8) or in the third position (see FIG. 9). The third motor 46 is vertically lower than the rotation axis center of the apparatus body 2 viewed in the rotation axis direction of the apparatus body 2 when the apparatus body 2 is in the second position (see FIG. 8) or in the third position (see FIG. 9). Accordingly, the three motors of the four motors, that is, the first motor 43, the second motor 44, the fourth motor 45, and the third motor 46 are vertically lower than the rotation axis center of the apparatus body 2 viewed in the rotation axis direction of the apparatus body 2. Accordingly, the structure in which the center of gravity of the apparatus body 2 in the vertical direction is equal to or lower than the rotation axis center of the apparatus body 2 can be readily provided.

Figure 11:
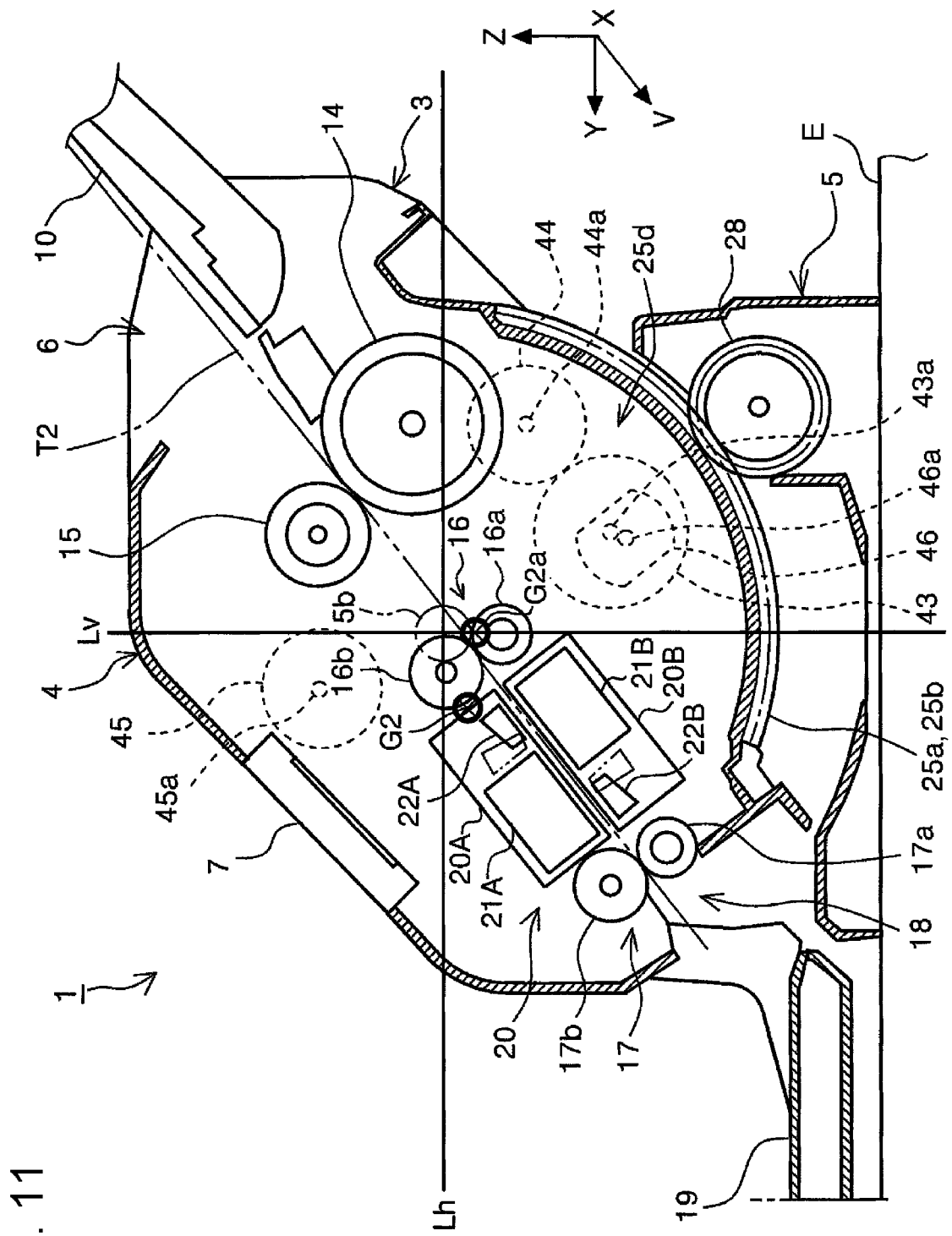
FIG. 11 illustrates a document transport path in a scanner with a front cover and a top cover open, viewed in the rotation axis direction of an apparatus body in a state in which the apparatus body is in a second position.
Figure 12:
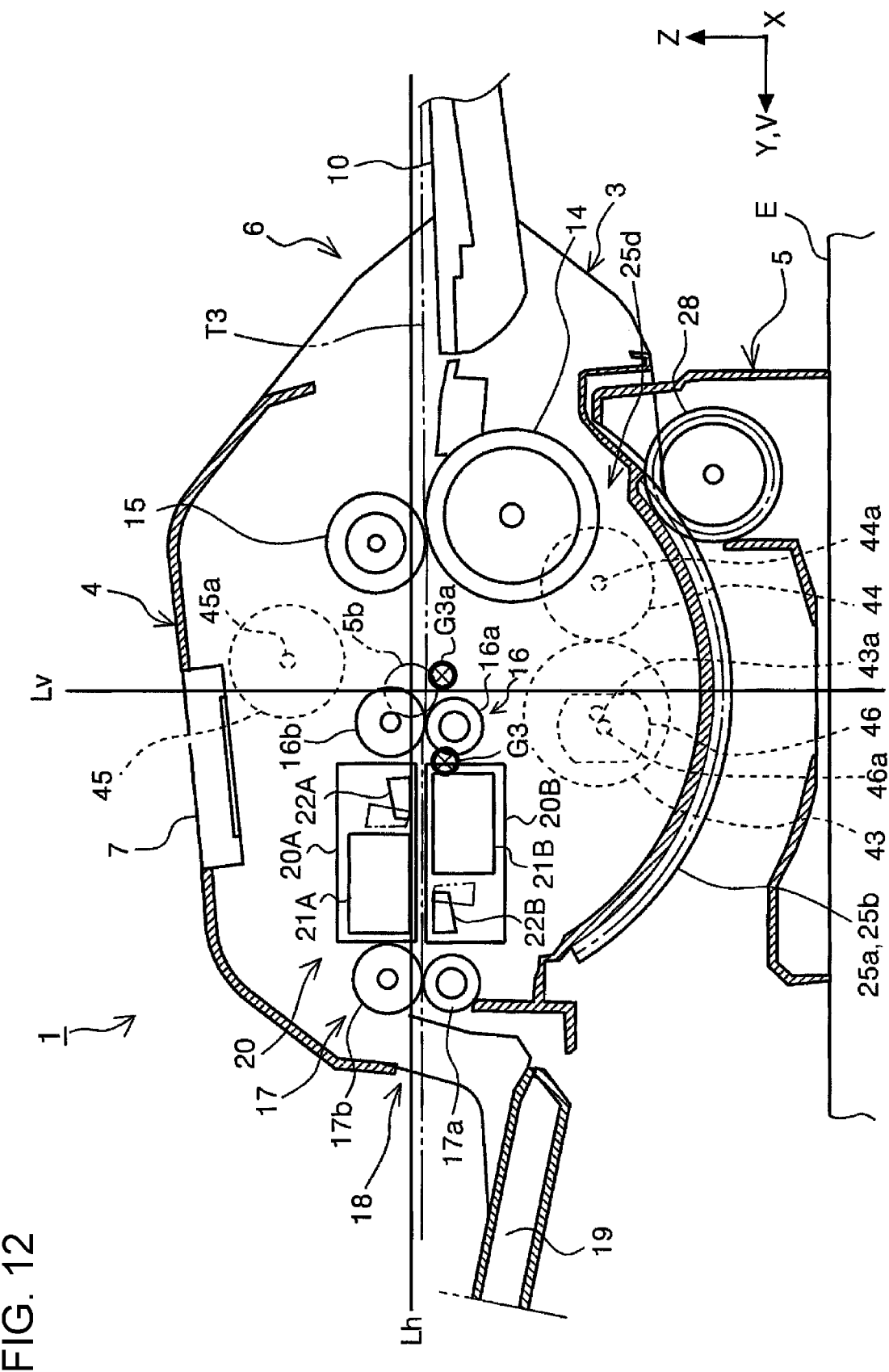
FIG. 12 illustrates a document transport path in a scanner with a front cover and a top cover open, viewed in the rotation axis direction of an apparatus body in a state in which the apparatus body is in a third position.
Figure 13:
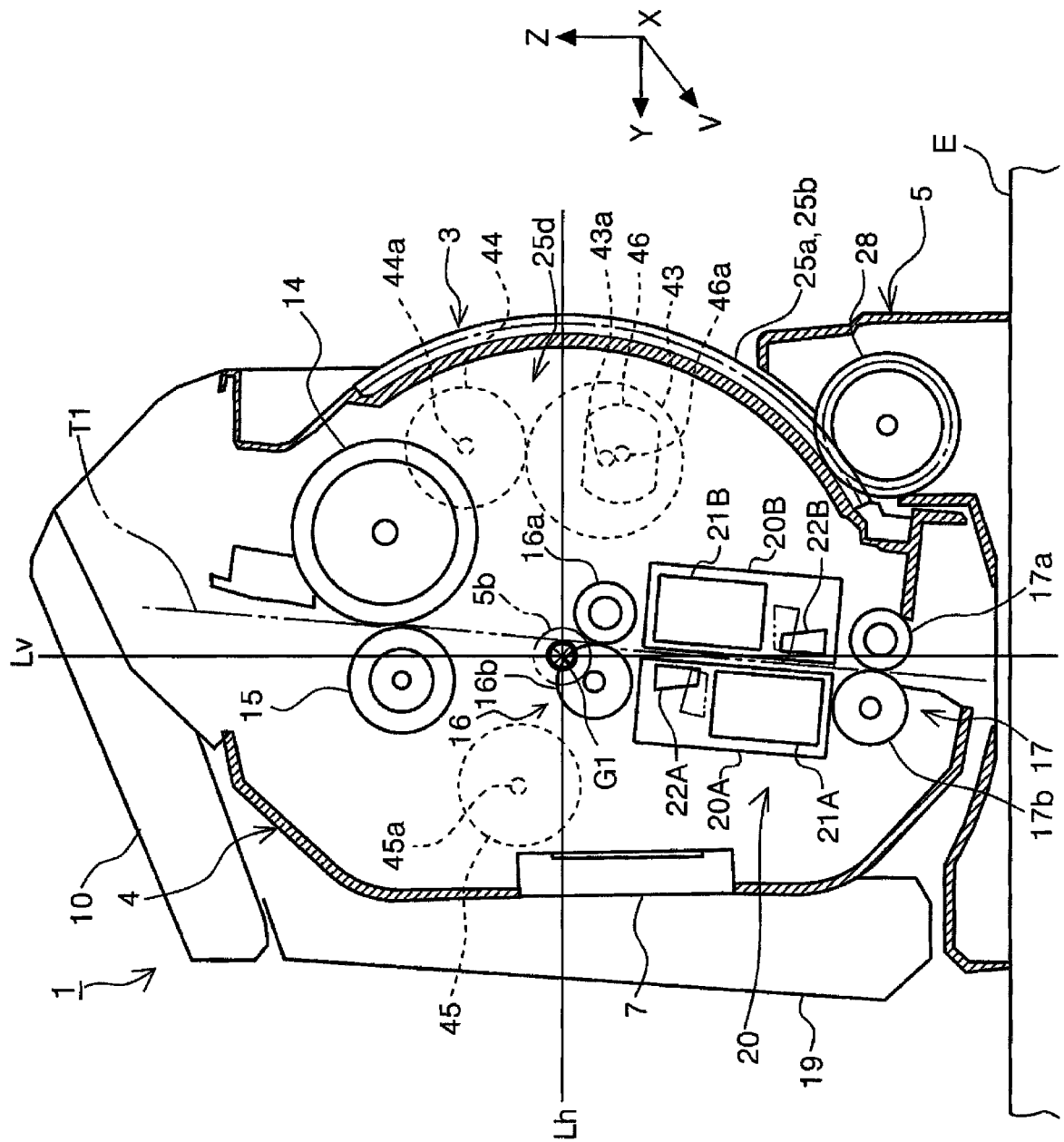
FIG. 13 illustrates a document transport path in a scanner with a front cover and a top cover closed, viewed in the rotation axis direction of an apparatus body in a state in which the apparatus body is in a first position.

Hereinafter, the arrangement of the motors will be described further in detail. FIG. 11, FIG. 12, and FIG. 13 illustrate rotation drive shafts of the corresponding motors in addition to the illustration in FIG. 8, FIG. 9, and FIG. 10 respectively and in which the illustration of the main board 47 is omitted. The rotation drive shafts of the motors in this embodiment are parallel in the X-axis direction. A rotation drive shaft 43a of the first motor 43 is vertically lower than the rotation axis center of the apparatus body 2 viewed in the rotation axis direction of the apparatus body 2 when the apparatus body 2 is in the first position (see FIG. 13), the second position (see FIG. 11) or the third position (see FIG. 12). A rotation drive shaft 44a of the second motor 44 is vertically higher than the rotation axis center of the apparatus body 2 viewed in the rotation axis direction of the apparatus body 2 when the apparatus body 2 is in the first position (see FIG. 13). The rotation drive shaft 44a is vertically lower than the rotation axis center of the apparatus body 2 viewed in the rotation axis direction of the apparatus body 2 when the apparatus body 2 is in the second position (see FIG. 11) or in the third position (see FIG. 12).

A rotation drive shaft 46a of the third motor 46 is vertically lower than the rotation axis center of the apparatus body 2 viewed in the rotation axis direction of the apparatus body 2 when the apparatus body 2 is in the first position (see FIG. 13), the second position (see FIG. 11), or the third position (see FIG. 12). A rotation drive shaft 45a of the fourth motor 45 is vertically higher than the rotation axis center of the apparatus body 2 viewed in the rotation axis direction of the apparatus body 2 when the apparatus body 2 is in the first position (see FIG. 13), the second position (see FIG. 11), or the third position (see FIG. 12).

The pair of transport rollers 16 and the pair of discharge rollers 17 are vertically lower than the rotation axis center of the apparatus body 2 viewed in the rotation axis direction of the apparatus body 2 when the apparatus body 2 is in the first position (see FIG. 10). Here, the pair of transport rollers 16 and the pair of discharge rollers 17 are heavy objects in the scanner 1 and are components that greatly affect the center of gravity of the apparatus. As described above, the pair of transport rollers 16 and the pair of discharge rollers 17 are vertically lower than the rotation axis center of the apparatus body 2 when the apparatus body 2 is in the first position. Accordingly, the structure in which the center of gravity of the apparatus body 2 in the vertical direction is equal to or lower than the rotation axis center of the apparatus body 2 can be readily provided.

The main board 47 is vertically lower than the rotation axis center of the apparatus body 2 viewed in the rotation axis direction of the apparatus body 2 when the apparatus body 2 is in the second position (see FIG. 8) or in the third position (see FIG. 9). Here, the main board 47 is a heavy object in the scanner 1 and is a component that greatly affects the center of gravity of the apparatus. As described above, the main board 47 is vertically lower than the rotation axis center of the apparatus body 2 viewed in the rotation axis direction of the apparatus body 2. Accordingly, the structure in which the center of gravity of the apparatus body 2 in the vertical direction is equal to or lower than the rotation axis center of the apparatus body 2 can be readily provided. More specifically, part of the main board 47, which is a substrate, is vertically higher than the rotation axis center of the apparatus body 2 viewed in the rotation axis direction of the apparatus body 2 in the first position. In the second position or in the third position, the entire main board 47 is vertically lower than the rotation axis center of the apparatus body 2 viewed in the rotation axis direction of the apparatus body 2.

In the above description, although the position in which the apparatus body 2 is not in use is defined as the first position illustrated in FIG. 3, FIG. 4, and FIG. 10, and the position in which the apparatus body 2 is reading a document is defined as the second position illustrated in FIG. 1, FIG. 2, FIG. 6, and FIG. 8 and as the third position illustrated in FIG. 7 and FIG. 9, these are mere examples and any other definitions may be made. For example, as a definition of a position of the apparatus body 2, a predetermined position of the apparatus body 2 may be defined as a first position and a position to which the apparatus body 2 is turned with respect to the first position may be defined as a second position. In such a case, when the first position in FIG. 10 is defined as a position in which the apparatus body 2 is not in use, the second position may be the position in which the apparatus body 2 is reading a document illustrated in FIG. 1, FIG. 2, FIG. 6, and FIG. 8 or the position in which the apparatus body 2 is reading a document illustrated in FIG. 7 and FIG. 9. Alternatively, when a first position is defined as the position in which the apparatus body 2 is reading a document illustrated in FIG. 1, FIG. 2, FIG. 6, and FIG. 8, a second position may be the position in which the apparatus body 2 is reading a document illustrated in FIG. 7 and FIG. 9.

In addition, as another definition of positions of the apparatus body 2, the position in which the apparatus body 2 does not perform reading operation illustrated in FIG. 10 may be defined as a first position, the position in which the apparatus body 2 is turned with respect to the first position illustrated in FIG. 1, FIG. 2, FIG. 6, and FIG. 8 may be defined as a second position, and the position in which the apparatus body 2 is turned with respect to the second position and the apparatus body 2 is reading a document illustrated in FIG. 7 and FIG. 9 may be defined as a third position.

In the above description, as states of the top cover 10, which functions as a feed tray, and the front cover 19, which functions as a discharge tray, an open state and a closed state are defined; however, this definition may include following states. For example, the definition may include a state in which the top cover 10 and the front cover 19 are extended from the apparatus body 2, a state in which the top cover 10 and the front cover 19 are accommodated in the apparatus body 2, a state in which several trays are unfolded, and a state in which several trays are folded. The support section 5 that turnably supports the apparatus body 2 may include a holder that holds the apparatus body 2 step by step, for example, in a first position, a second position, and a third position, or may include a holder that steplessly holds the apparatus body 2.

Although the center of gravity of the apparatus body 2 in the vertical direction is lower than the rotation axis center of the apparatus body 2 viewed in the rotation axis direction of the apparatus body 2 in the second position in which the apparatus body 2 is reading a document illustrated in FIG. 1, FIG. 2, FIG. 6, and FIG. 8 and in the third position in which the apparatus body 2 is reading an image illustrated in FIG. 7 and FIG. 9, the stability of the apparatus body 2 with respect to the support section 5 can be ensured when the center of gravity corresponds to the rotation shaft 5b or the rotation axis center in the second position or in the third position, or both in the second position and the third position.

It is to be understood that the present disclosure is not limited to the above-described embodiments, various modifications can be made within the scope of the following claims, and these modifications are included within the scope of the present disclosure. For example, the front cover 19 that functions as a discharge tray according to the embodiment is disposed in the apparatus body 2; however, the front cover 19 may be disposed in the support section 5. In such a case, the apparatus can be configured so as to satisfy all of the above-described relationships regarding the center of gravity.

What is claimed is:

1. An image reading apparatus comprising:
   a support section in contact with a mounting surface on which the apparatus is mounted;
   an apparatus body including a reader configured to read a document, the apparatus body being configured to be turned with respect to the support section for position change; and
   a position holding section for holding a position of the apparatus body with respect to the support section, wherein
   the position of the apparatus body can be switched between a first position in which the apparatus body is not in use and a second position in which the apparatus body reads a document using the reader, and in which a projected area of the apparatus body on the mounting surface is larger than that in the first position, and
   the center of gravity of the apparatus body is lower than or equal to a rotation axis center of the apparatus body in a vertical direction viewed in a rotation axis direction of the apparatus body when the apparatus body is in the first position or in the second position.

2. The image reading apparatus according to claim 1, wherein when the apparatus body is in the first position, the center of gravity of the apparatus body overlaps with the rotation axis center of the apparatus body viewed in the rotation axis direction of the apparatus body.

3. The image reading apparatus according to claim 1, wherein the apparatus body includes
   a feed tray configured to support the document to be fed, and
   a discharge tray configured to support the document that is read and discharged, wherein
   the feed tray and the discharge tray are configured to be switched between an open state and a closed state with respect to the apparatus body,
   the apparatus body is configured to be switched to a third position in which the apparatus body reads the document using the reader and in which a projected area of the apparatus body on the mounting surface is larger than that in the second position, and
   the center of gravity of the apparatus body is lower than or equal to the rotation axis center of the apparatus body in the vertical direction viewed in the rotation axis direction of the apparatus body when the apparatus body is in the second position or in the third position regardless of an open/close state of the feed tray and the discharge tray.

4. The image reading apparatus according to claim 1, wherein the apparatus body includes a pair of transport rollers disposed upstream of the reader in a straight document transport path on which the document is transported, the pair of transport rollers being configured to transport the document downstream;
a feed roller disposed upstream of the pair of transport rollers in the document transport path, the feed roller being configured to feed the document downstream;
a pair of discharge rollers disposed downstream of the reader, the pair of discharge rollers being configured to discharge the document;
a first motor that is a drive source for the pair of transport rollers and the pair of discharge rollers; and
a second motor that is a drive source for the feed roller, wherein
the apparatus body is configured to be switched to a third position in which the apparatus body reads a document using the reader and in which a projected area of the apparatus body on the mounting surface is larger than that in the second position, and
the first motor and the second motor are lower than the rotation axis center of the apparatus body in the vertical direction viewed in the rotation axis direction of the apparatus body when the apparatus body is in the second position or in the third position.

5. The image reading apparatus according to claim 4, wherein the apparatus body includes
a separation roller configured to nip and separate a document with the feeding roller;
a background plate disposed at a position facing the reader, the background plate being configured to be switched between a facing state in which the background plate faces the reader and a non-facing state in which the background plate does not face the reader;
a third motor that is a power source for switching the state of the background plate; and
a fourth motor that is a drive source for the separation roller, wherein
the fourth motor is higher than the rotation axis center of the apparatus body in the vertical direction viewed in the rotation axis direction of the apparatus body when the apparatus body is in the second position or in the third position, and
the third motor is lower than the rotation axis center of the apparatus body in the vertical direction viewed in the rotation axis direction of the apparatus body when the apparatus body is in the second position or in the third position.

6. The image reading apparatus according to claim 4, wherein the pair of transport rollers and the pair of discharge rollers are lower than the rotation axis center of the apparatus body in the vertical direction viewed in the rotation axis direction of the apparatus body when the apparatus body is in the first position.

7. The image reading apparatus according to claim 1, wherein the apparatus body includes a substrate on which electronic components are mounted,
the apparatus body is configured to be switched to a third position in which the apparatus body reads the document using the reader, and in which a projected area of the apparatus body on the mounting surface is larger than that in the second position, and
the substrate is lower than the rotation axis center of the apparatus body in the vertical direction viewed in the rotation axis direction of the apparatus body when the apparatus body is in the second position or in the third position.

8. An image reading apparatus comprising:
a support section in contact with a mounting surface on which the apparatus is mounted;
an apparatus body including a reader configured to read a document, the apparatus body configured to be turnable with respect to the support section for position change; and
a position holding section for holding a position of the apparatus body with respect to the support section, wherein
the apparatus body is configured to be switched between two different positions, and
the center of gravity of the apparatus body in the two positions is lower than or equal to a rotation shaft of the apparatus body in a vertical direction viewed in the rotation axis direction of the apparatus body.

9. The image reading apparatus according to claim 8, wherein the center of gravity of the apparatus body overlaps with the rotation shaft of the apparatus body viewed in the rotation axis direction of the apparatus body when the apparatus body is in one of the two positions, and
the center of gravity of the apparatus body is lower than the center of gravity in the one position when the apparatus body is in the other position of the two positions.

10. The image reading apparatus according to claim 8, wherein the apparatus body includes a feed tray configured to support the document to be fed, and
a discharge tray configured to support the document that is read and discharged, wherein
the feed tray and the discharge tray are configured to be switched between an open state and a closed state with respect to the apparatus body.

11. The image reading apparatus according to claim 10, wherein the center of gravity of the apparatus body is lower than the rotation axis center of the apparatus body viewed in the rotation axis direction of the apparatus body when the apparatus body is in the one position with the feed tray and the discharge tray being opened or when the apparatus body is in the other position with the feed tray and the discharge tray being opened.

12. The image reading apparatus according to claim 11, wherein the center of gravity of the apparatus body is lower than the rotation axis center of the apparatus body viewed in the rotation axis direction of the apparatus body when the apparatus body is in the one position with the feed tray and the discharge tray being closed or when the apparatus body is in the other position with the feed tray and the discharge tray being closed.

13. The image reading apparatus according to claim 12, wherein the center of gravity of the apparatus body moves forward when the apparatus body is in the one position or in the other position and both of the feed tray and the discharge tray are opened from the closed state.

14. An image reading apparatus comprising:
a support section in contact with a mounting surface on which the apparatus is mounted;
an apparatus body including a reader configured to read a document, the apparatus body being configured to be turnable with respect to the support section for position change; and
a position holding section for holding a position of the apparatus body with respect to the support section, wherein
the apparatus body is configured to be switched between a first position in which the apparatus body does not read a document using the reader and a second position in which the apparatus body reads a document using the reader, the second position turned from the first position, and the center of gravity of the apparatus body is lower than or equal to a rotation axis center of the apparatus body in a vertical direction viewed in a rotation axis direction of the apparatus body when the apparatus body is in the first position or in the second position.

15. The image reading apparatus according to claim 14, wherein the apparatus body is configured to be switched to a third position in which the apparatus body reads a document using the reader and in which the apparatus body is turned from the second position in the same direction as the direction in which the apparatus body is turned from the first position to the second position, and the center of gravity of the apparatus body is lower than the rotation axis center of the apparatus body in the vertical direction viewed in the rotation axis direction of the apparatus body when the apparatus body is in the third position.

16. The image reading apparatus according to claim 15, wherein the apparatus body includes a pair of transport rollers disposed upstream of the reader in a straight document transport path on which a document is transported, the pair of transport rollers being configured to transport the document downstream;

a feed roller disposed upstream of the pair of transport rollers in the document transport path, the feed roller being configured to feed the document downstream;

a pair of discharge rollers disposed downstream of the reader, the pair of discharge rollers being configured to discharge the document;

a first motor that is a drive source for at least one of the pair of transport rollers and the pair of discharge rollers; and a second motor that is a drive source for the feed roller, wherein a drive shaft of the first motor is lower than the rotation axis center of the apparatus body in the vertical direction viewed in the rotation axis direction of the apparatus body when the apparatus body is in the first position, in the second position, or in the third position.

17. The image reading apparatus according to claim 16, wherein a drive shaft of the second motor is higher than the rotation axis center of the apparatus body in the vertical direction viewed in the rotation axis direction of the apparatus body when the apparatus body is in the first position, and the drive shaft of the second motor is lower than the rotation axis center of the apparatus body in the vertical direction viewed in the rotation axis direction of the apparatus body when the apparatus body is in the second position or in the third position.

18. The image reading apparatus according to claim 16, wherein the apparatus body includes a background plate disposed at a position facing the reader, the background plate being configured to be switched between a facing state in which the background plate faces the reader and a non-facing state in which the background plate does not face the reader; and a third motor that is a power source for switching the state of the background plate, wherein a drive shaft of the third motor is lower than the rotation axis center of the apparatus body in the vertical direction viewed in the rotation axis direction of the apparatus body when the apparatus body is in the first position, in the second position, or in the third position.

19. The image reading apparatus according to claim 16, wherein the apparatus body includes a separation roller configured to nip and separate a document with the feeding roller; and a fourth motor that is a drive source for the separation roller, wherein a drive shaft of the fourth motor is higher than the rotation axis center of the apparatus body in the vertical direction viewed in the rotation axis direction of the apparatus body when the apparatus body is in the first position, in the second position, or in the third position.

20. The image reading apparatus according to claim 15, wherein the apparatus body includes a substrate on which electronic components configured to control the reader are mounted, wherein a part of the substrate is higher than the rotation axis center of the apparatus body in the vertical direction viewed in the rotation axis direction of the apparatus body when the apparatus body is in the first position, and the substrate is lower than the rotation axis center of the apparatus body in the vertical direction viewed in the rotation axis direction of the apparatus body when the apparatus body is in the second position or in the third position.

* * * * *